US008049394B2

(12) United States Patent
Kouma et al.

(10) Patent No.: US 8,049,394 B2
(45) Date of Patent: Nov. 1, 2011

(54) MICRO OSCILLATING COMB TOOTH ELEMENT WITH TWO INTERESECTING OSCILLATION AXES

(75) Inventors: Norinao Kouma, Kawasaki (JP);
Osamu Tsuboi, Kawasaki (JP);
Hiromitsu Soneda, Kawasaki (JP);
Satoshi Ueda, Kawasaki (JP); Ippei Sawaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/659,975

(22) Filed: Mar. 26, 2010

(65) Prior Publication Data

US 2010/0231087 A1 Sep. 16, 2010

Related U.S. Application Data

(62) Division of application No. 11/271,959, filed on Nov. 14, 2005, now abandoned.

(30) Foreign Application Priority Data

Dec. 2, 2004 (JP) .................................. 2004-349793

(51) Int. Cl.
*G02B 26/08* (2006.01)
*H02N 1/00* (2006.01)

(52) U.S. Cl. ....... 310/309; 385/18; 359/225.1; 359/290; 359/291

(58) Field of Classification Search .................. 310/309; 385/18, 22, 140; 359/223.1, 224.1, 224.2, 359/225.1, 226.1, 226.2, 290, 291, 872
See application file for complete search history.

(56) References Cited

U.S. PATENT DOCUMENTS

| 5,740,150 | A | 4/1998 | Uchimaru et al. ............. 369/119 |
| 5,959,760 | A * | 9/1999 | Yamada et al. ............. 359/224.1 |
| 6,073,484 | A | 6/2000 | Miller et al. ..................... 73/105 |
| 6,423,563 | B2 | 7/2002 | Fukada et al. .................. 438/50 |
| 6,744,173 | B2 * | 6/2004 | Behin et al. ................... 310/309 |
| 7,239,774 | B1 | 7/2007 | Stowe et al. ..................... 385/19 |
| 7,550,895 | B2 | 6/2009 | Tsuboi et al. .................. 310/309 |
| 2001/0044165 | A1 | 11/2001 | Lee et al. ......................... 438/52 |
| 2004/0155556 | A1 | 8/2004 | Onoda et al. .................. 310/309 |

(Continued)

FOREIGN PATENT DOCUMENTS

JP 9-146032 6/1997

(Continued)

OTHER PUBLICATIONS

Manual Translation of JP 2004-082288, Mar. 18, 2004, Murai et al., "Electrostatic Actuator and Optical Switch Using the Same".

*Primary Examiner* — Karl Tamai
(74) *Attorney, Agent, or Firm* — Kratz, Quintos & Hanson, LLP

(57) ABSTRACT

A micro oscillating element includes a frame and an oscillation section connected to the frame via a torsional joining section. The oscillation section includes a movable functional section, an arm section and a first comb-tooth electrode. The arm section extends from the functional section. The first comb-tooth electrode includes first electrode teeth extending from the arm section in a direction intersecting the arm section. The micro oscillating element further includes a second comb-tooth electrode to cooperate with the first comb-tooth electrode for causing the oscillation section to oscillate about an oscillation axis defined by the torsional joining section. The second comb-tooth, electrode includes second electrode teeth extending from the frame in a direction intersecting the arm section.

6 Claims, 31 Drawing Sheets

U.S. PATENT DOCUMENTS

| | | |
|---|---|---|
| 2005/0231787 A1* | 10/2005 | Tsuboi et al. ............... 359/290 |
| 2006/0119216 A1 | 6/2006 | Kouma et al. ............... 310/309 |
| 2006/0120425 A1* | 6/2006 | Kouma et al. ............. 372/43.01 |
| 2006/0203319 A1 | 9/2006 | Kouma et al. ............... 359/224 |
| 2008/0239456 A1* | 10/2008 | Tsuboi et al. ............... 359/291 |
| 2009/0001847 A1* | 1/2009 | Tsuboi et al. ............... 310/309 |
| 2009/0225387 A1* | 9/2009 | Mizuno et al. ............. 359/221.2 |
| 2009/0267445 A1* | 10/2009 | Mizuno et al. ............. 310/300 |
| 2010/0007940 A1* | 1/2010 | Tsuboi et al. ............... 359/295 |
| 2010/0067083 A1* | 3/2010 | Tsuboi et al. ............. 359/221.2 |
| 2010/0085623 A1* | 4/2010 | Matsumoto et al. ....... 359/221.2 |
| 2010/0092130 A1* | 4/2010 | Soneda et al. ................. 385/18 |

FOREIGN PATENT DOCUMENTS

| | | |
|---|---|---|
| JP | 9-146034 | 6/1997 |
| JP | 10-190007 | 7/1998 |
| JP | 2000-31502 | 1/2000 |
| JP | 2004-082288 | 3/2004 |

* cited by examiner

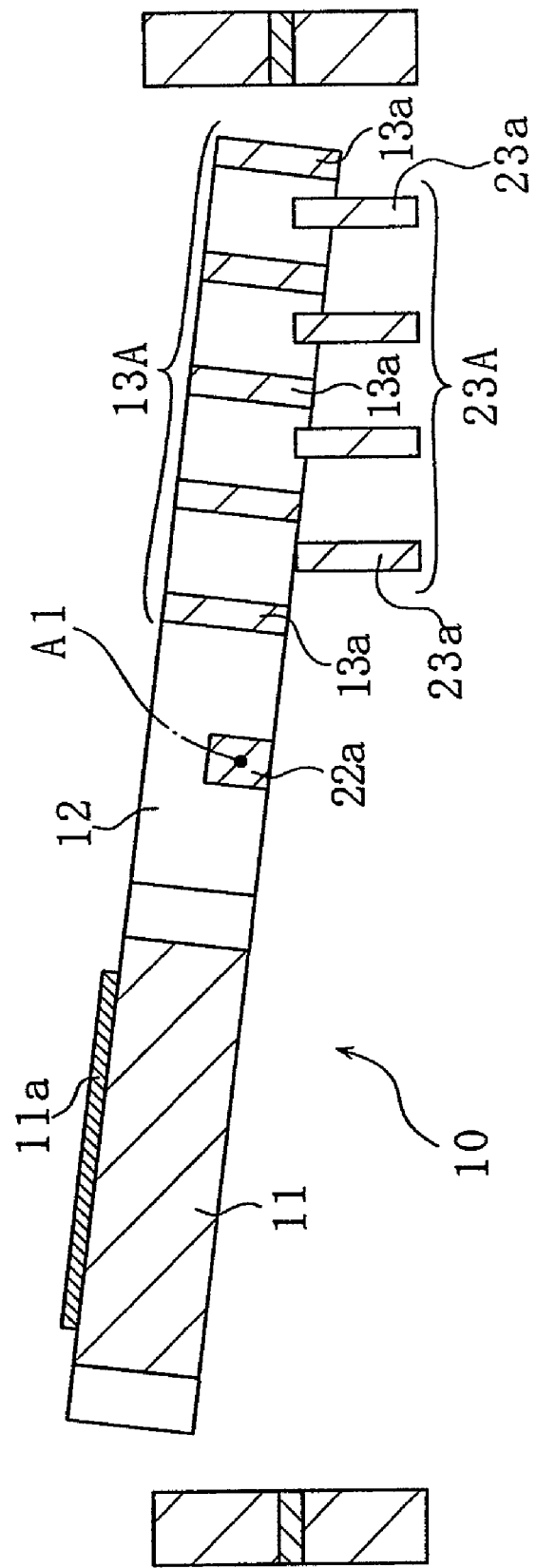

MICRO OSCILLATING COMB TOOTH ELEMENT WITH TWO INTERESECTING OSCILLATION AXES

CROSS-REFERENCE TO RELATED APPLICATION

This application is a division of U.S. patent application Ser. No. 11/271,959, entitled Micro Oscillating Element, filed on Nov. 14, 2005 now abandoned, the entire contents of which are entirely incorporated herein by reference.

BACKGROUND OF THE INVENTION

1. Field of the Invention

The present invention generally relates to a micro oscillating element having an oscillation section capable of rotary displacement. In particular, the present invention relates to a micromirror element, an acceleration sensor, an angular velocity sensor, and a vibration element, for example.

2. Description of the Related Art

In recent years, elements having a microstructure formed by micromachining technology have been put to practical use in various technological fields. In the field of optical communication technology, for example, minute micromirror elements having a light reflecting function are gaining attention.

In optical communication, optical signals are transmitted using optical fiber as a medium, and an optical switching device is typically used to switch the transmission path of the optical signal from one fiber to another fiber. To achieve favorable optical communication, the characteristics required of the optical switching device include a large capacity, high velocity, and high reliability during the switching operation. With these considerations in mind, high expectations are being placed on optical switching devices incorporating a micromirror element manufactured using micromachining technology. A micromirror element is capable of performing switching processing between an input side optical transmission path and an output side optical transmission path in the optical switching device without converting the optical signal into an electrical signal, and is therefore suitable for obtaining the characteristics listed above.

A micromirror element comprises a mirror surface for reflecting light, and is capable of varying the direction in which the light is reflected by oscillating the mirror surface. Electrostatic micromirror elements which use electrostatic force to tilt the mirror surface are employed in many devices. Electrostatic micromirror elements can be divided into two main types, those manufactured by so-called surface micromachining technology, and those manufactured by so-called bulk micromachining technology.

In surface micromachining technology, material thin film corresponding to each constitutional region is machined into a desired pattern, and such patterns are laminated successively to form the various regions constituting the element, such as a supporting and fixing portion, an oscillation section, a mirror surface, and an electrode portion, and a sacrificial layer which is removed at a later stage. In bulk micromachining technology, on the other hand, a material substrate is itself etched to form the fixing and supporting portion, the oscillation section, and so on into a desired form, whereupon the mirror surface and electrodes are formed with thin film. Bulk micromachining technology is described in Japanese Unexamined Patent Application Publication H9-146032, Japanese Unexamined Patent Application Publication H9-146034, Japanese Unexamined Patent Application Publication H10-190007, and Japanese Unexamined Patent Application Publication 2000-31502, for example.

One of the technological items required of a micromirror element is that the mirror surface for reflecting light has a high degree of flatness. However, with surface micromachining technology, the mirror surface that is ultimately formed is thin, and therefore buckles easily. Accordingly, it is difficult to achieve a high degree of flatness on a mirror surface with a large surface area. Conversely, with bulk micromachining technology, the relatively thick material substrate itself is cut into by etching technology to form a mirror supporting portion, and the mirror surface is provided on the mirror supporting portion. Hence the rigidity of even a mirror surface with a large surface area can be secured. As a result, a mirror surface having a sufficiently high degree of optical flatness can be formed.

FIG. 32 is a partial perspective view of a conventional micromirror element X6 manufactured according to bulk micromachining technology. The micromirror element X6 comprises a mirror supporting portion 61 provided with a mirror surface 64 on its upper face, a frame 62 (partially omitted from the drawing), and a pair of torsion bars 63 connecting the mirror supporting portion 61 and frame 62. Comb-tooth electrodes 61a, 61b are formed on the pair of end portions of the mirror supporting portion 61. A pair of inwardly-extending comb-tooth electrodes 62a, 62b is formed on the frame 62 corresponding to the comb-tooth electrodes 61a, 61b. The pair of torsion bars 63 defines an oscillation axis A6 of the oscillating operation of the mirror supporting portion 61 in relation to the frame 62.

In the micromirror element X6 constituted in this manner, one set of the comb-tooth electrodes provided close to each other for generating a driving force (electrostatic attraction), for example the comb-tooth electrodes 61a and 62a, are oriented in two tiers when no voltage is applied, as shown in FIG. 33A. However, when a predetermined voltage is applied, the comb-tooth electrode 61a is attracted toward the comb-tooth electrode 62a, as shown in FIG. 33B, whereby the mirror supporting portion 61 is rotationally displaced. More specifically, when the comb-tooth electrode 61a is charged positively and the comb-tooth electrode 62a is charged negatively, the comb-tooth electrode 61a is attracted toward the comb-tooth electrode 62a, and thereby the mirror supporting portion 61 is rotationally displaced about the oscillation axis A6 with the torsion bars 63 being twisted. By driving the mirror supporting portion 61 to tilt in this manner, the reflection direction of the light that is reflected by the mirror surface 64 provided on the mirror supporting portion 61 is switched.

To miniaturize the micromirror element X6 along the oscillation axis A6, the length L61 of the mirror supporting portion 61, which occupies most part of the element, need be shortened. However, shrinking the length L61 cannot easily be compatible with maintaining the driving force enough to oscillate the mirror supporting portion 61.

In the micromirror element X6, the plurality of electrode teeth of the respective comb-tooth electrodes 61a, 61b are supported on the mirror supporting portion 61 at intervals in the oscillation axis A6 direction, and therefore the number of electrode teeth of the comb-tooth electrodes 61a, 61b is restricted by the length L61 of the mirror supporting portion 61. As a result, the number of electrode teeth constituting the set of comb-tooth electrodes 61a, 62a and the number of electrode teeth constituting the set of comb-tooth electrodes 61b, 62b are restricted by the length L61 of the mirror supporting portion 61. Furthermore, in order to secure enough driving force to drive the oscillating operation of the mirror supporting portion 61, or in other words to secure the electrostatic attraction that can be generated between the comb-tooth electrodes 61a, 62a and the comb-tooth electrodes 61b, 62b, a sufficient surface area to allow the electrode teeth of the set of comb-tooth electrodes 61a, 62a to face each other and a sufficient surface area to allow the electrode teeth of the set of comb-tooth electrodes 61b, 62b to face each other must be secured. To secure such a surface area enabling the electrode teeth to face each other when the length L61 of the mirror supporting portion 61 has been reduced, a method of reducing a width d1 of each electrode tooth and narrowing a gap d2 between the electrode teeth such that the number of electrode teeth of the comb-tooth electrodes 61a, 61b, 62a, 62b is set at no less than a fixed number, or a method of increasing the distance between the mirror supporting portion 61 and the frame 62 and increasing a length d3 of each electrode tooth, may be considered.

However, reducing the width d1 and increasing the length d3 of the electrode teeth lead to a reduction in mechanical strength in the width direction of the electrode teeth. As a result, when a voltage is applied as described above with reference to FIG. 33B, the electrode teeth deform in the width direction thereof, causing a defect whereby the electrode teeth stick to adjacent teeth. Further, reducing the gap d2 between the electrode teeth leads to difficulties in the manufacturing process of the micromirror element X6, decreases in yield, and so on.

Hence there are difficulties involved in miniaturizing the micromirror element X6 through contraction of the oscillation axis A6 direction while maintaining enough driving force to drive the oscillating operation of the mirror supporting portion 61. In micro oscillating elements such as the micromirror element X6, a characteristic whereby large rotary displacement and a high speed oscillating operation can be realized at a low drive voltage is typically demanded of the region in which the oscillating operation takes place, but in order to obtain such a characteristic, the driving force for driving the oscillating operation of the oscillation section must be held at no less than a fixed level.

SUMMARY OF THE INVENTION

The present invention has been proposed in consideration of the circumstances described above, and it is an object thereof to provide a micro oscillating element which can be miniaturized while maintaining sufficient driving force for driving the oscillating operation of an oscillation section.

A micro oscillating element provided in accordance with the present invention comprises: an oscillation section supporting frame; and an oscillation section including a movable functional section, an arm section, and a first comb-tooth electrode. The arm section extends from the movable functional section. The first comb-tooth electrode comprises a plurality of first electrode teeth each extending from the arm section in a direction intersecting the arm section. Further, the micro oscillating element comprises: a torsional joining section which connects the frame and the oscillation section to each other, and also defines an oscillation axis of an oscillating operation of the oscillation section; and a second comb-tooth electrode cooperating with the first comb-tooth electrode for causing the oscillation section to oscillate. The second comb-tooth electrode comprises a plurality of second electrode teeth each extending from the frame in a direction intersecting the arm section.

In the above arrangement, the first and second comb-tooth electrodes constitute a so-called comb-tooth electrode-type actuator serving as a driving mechanism for driving the oscillating operation of the oscillation section. The element of the present invention may be applied to a micromirror element, for example.

According to the present invention, the first electrode teeth of the first comb-tooth electrode are supported on the arm section, which extends from the movable functional section. The first electrode teeth may be arranged at predetermined intervals (i.e., spaced from each other) in the longitudinal direction of the arm section, while the second electrode teeth may be supported on the frame and arranged at predetermined intervals in the longitudinal direction of the arm section. It should be appreciated that the first electrode teeth (and the second electrode teeth) are not supported directly on the movable functional section. As a result, the number of electrode teeth (first electrode teeth, second electrode teeth) constituting the set of comb-tooth electrodes is not restricted by the length of the movable functional section in the longitudinal direction of the oscillation axis, which intersects the elongated arm section at a right angle, for example. Hence in the element of the present invention, a surface area which enables the electrode teeth of the first and second comb-tooth electrodes to face each other can be secured by providing the first and second electrode teeth in a desired number, regardless of the design dimension of the movable functional section in the oscillation axis direction. Since a surface area which enables the electrode teeth of the first and second comb-tooth electrodes to face each other is secured, there is no need to reduce the width or increase the extension length of the first and second electrode teeth to the extent that the mechanical strength of the first and second comb-tooth electrodes is adversely affected, and there is also no need to reduce the gap between electrode teeth to the extent that difficulties arise in the manufacturing process of the element. Accordingly, the element of the present invention is suitable for achieving miniaturization by reducing the design dimension of the movable functional section, and accordingly the entire element, in the oscillation axis direction while maintaining enough driving force to drive the oscillating operation of the oscillation section by providing the first and second electrode teeth in a desired number, regardless of the design dimension of the movable functional section in the oscillation axis direction.

Preferably, the first electrode teeth may extend in parallel to the oscillation axis, and the second electrode teeth may preferably extend in parallel to the first electrode teeth. By making the extension direction of the first and second electrode teeth parallel to the oscillation axis, the force to cause the oscillation section to oscillate about the oscillation axis can be generated efficiently.

In another preferred aspect of the present invention, the extension direction of the plurality of first electrode teeth may intersect the extension direction of the oscillation axis. In this case, the extension direction of the second electrode teeth may preferably be parallel to the extension direction of the first electrode teeth. Even when the extension direction of the first and second electrode teeth is non-parallel to the oscillation axis, the driving force for driving the oscillating operation about the oscillation axis can be generated by the first and second comb-tooth electrodes.

The first comb-tooth electrode may preferably comprise at least three electrode teeth, and the distance between two adjacent first electrode teeth may preferably increase steadily as the teeth are farther from the oscillation axis. Further, the second comb-tooth electrode may preferably comprise at least three electrode teeth, and the distance between two adjacent second electrode teeth may preferably increase steadily as the teeth are away from the oscillation axis. As the first electrode teeth are further away from the oscillation axis, the displacement between the electrode teeth (as viewed in the extension direction of the arm section) during the oscillating operation of the oscillation section increases, and hence these constitutions are favorable for avoiding contact between the first electrode teeth and second electrode teeth during the oscillating operation of the oscillation section.

Preferably, a relevant one of the first electrode teeth may be positioned between two adjacent second electrode teeth (adjacent as viewed in the extension direction of the arm section), and the relevant tooth may be offset toward the oscillation axis from a central position between these two second electrode teeth. Alternatively, the same first electrode tooth may be offset away from the oscillation axis from the central position between these two second electrode teeth. These constitutions are favorable for suppressing the so-called pull-in phenomenon.

In a preferred aspect, the micro oscillating element of the present invention may further comprise a third comb-tooth electrode and a fourth comb-tooth electrode cooperating with the third comb-tooth electrode for causing the oscillation section to oscillate. The third comb-tooth electrode may comprise a plurality of third electrode teeth that extend from the arm section in a direction intersecting the arm section, and that are spaced from each other in a longitudinal direction of the arm section. The fourth comb-tooth electrode may comprise a plurality of fourth electrode teeth that extend from the frame in a direction intersecting the arm section. In this case, the fourth comb-tooth electrode may be electrically separated from the second comb-tooth electrode. In this case, the first and third comb-tooth electrodes may preferably be electrically connected to each other. According to this constitution, the electrostatic force generated between the first and second comb-tooth electrodes and the electrostatic force generated between the third and fourth comb-tooth electrodes can be caused to differ by making different the potential that is applied to the second comb-tooth electrode and the potential that is applied to the fourth comb-tooth electrode. As a result of this constitution, the rotary displacement of the movable functional section about a predetermined axis which intersects the oscillation axis can be controlled. In other words, the attitude of the movable functional section about this axis can be regulated.

In another preferred aspect, this micro oscillating element may further comprise an additional arm section extending from the movable functional section, a third comb-tooth electrode and a fourth comb-tooth electrode. The third comb-tooth electrode may comprise a plurality of third electrode teeth that extend from the additional arm section in a direction intersecting the additional arm section, and that are spaced from each other in a longitudinal direction of the additional arm section. The fourth comb-tooth electrode may comprise a plurality of fourth electrode teeth for causing the oscillation section to oscillate in cooperation with the third comb-tooth electrode. The fourth electrode teeth may be arranged to extend from the frame in a direction intersecting the additional arm section and to be spaced from each other in a longitudinal direction of the additional arm section. In this case, the first comb-tooth electrode and the third comb-tooth electrode may be electrically separated from each other. On the other hand, the second and the fourth comb-tooth electrodes may preferably be electrically connected to each other. According to this constitution, the electrostatic force generated between the first and second comb-tooth electrodes and the electrostatic force generated between the third and fourth comb-tooth electrodes can be caused to differ by making different the potential that is applied to the first comb-tooth electrode and the potential that is applied to the third comb-tooth electrode. As a result of this constitution, the rotary displacement of the movable functional section about a predetermined axis which intersects the oscillation axis can be controlled. In other words, the attitude of the movable functional section about this axis can be regulated.

The micro oscillating element may further comprise an additional frame, an additional torsional joining section and driving mechanism. The additional torsional joining section may connect the oscillation section supporting frame and the additional frame to each other and also defines an additional oscillation axis of an oscillating operation of the additional frame. The additional oscillation axis may extend in a direction intersecting the oscillation axis of the oscillation section supporting frame. The driving mechanism may cause the additional frame to oscillate about the additional oscillation axis. In this case, the extension direction of the oscillation axis may preferably be orthogonal to the extension direction of the additional oscillation axis. The element of this example is a biaxial oscillating element.

BRIEF DESCRIPTION OF THE DRAWINGS

FIG. 7 is a sectional view along the line III-III of FIG. 1 during driving;

DESCRIPTION OF THE PREFERRED EMBODIMENTS

Figure 1:
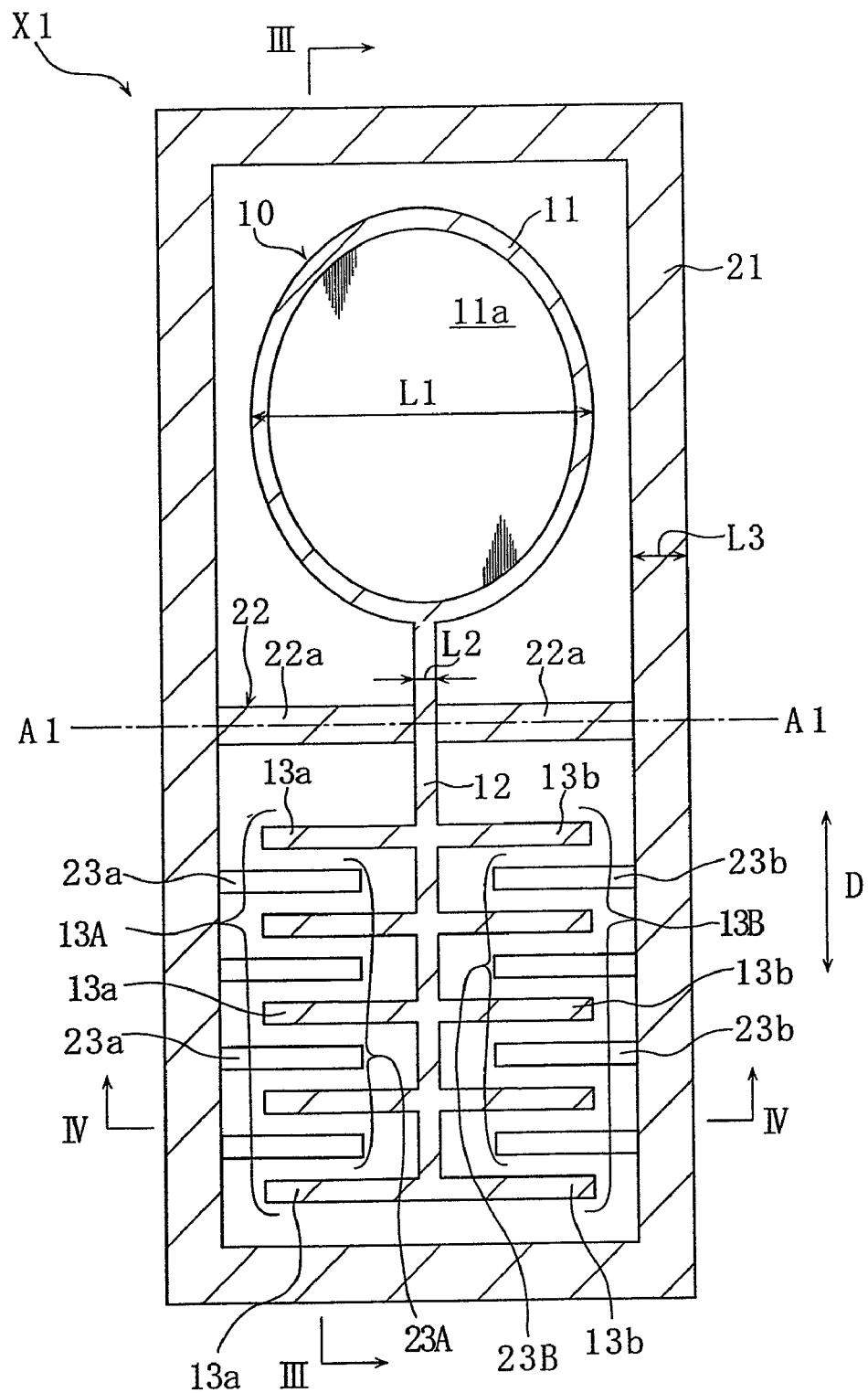
FIG. 1 is a plan view of a micromirror element according to a first embodiment of the present invention.
Figure 2:
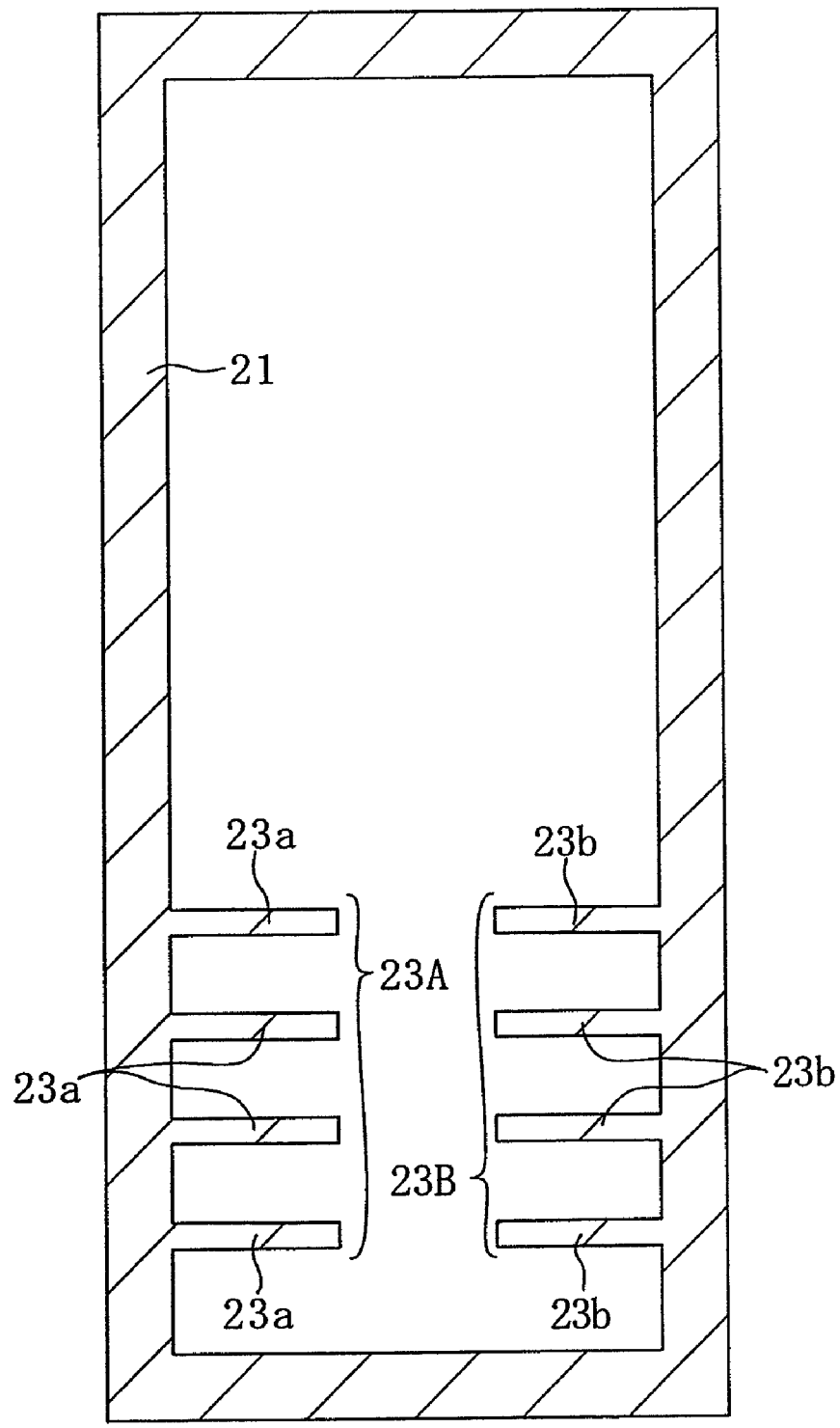
FIG. 2 is a partial plan view of the micromirror element shown in FIG. 1.
Figure 3:
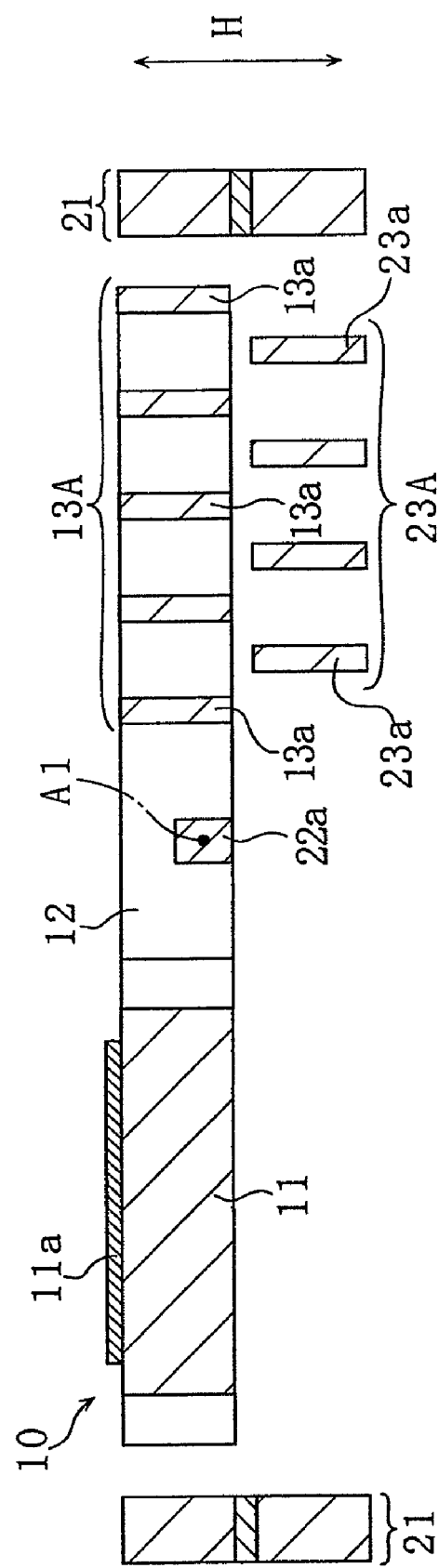
FIG. 3 is a sectional view along a line III-III in FIG. 1.
Figure 4:
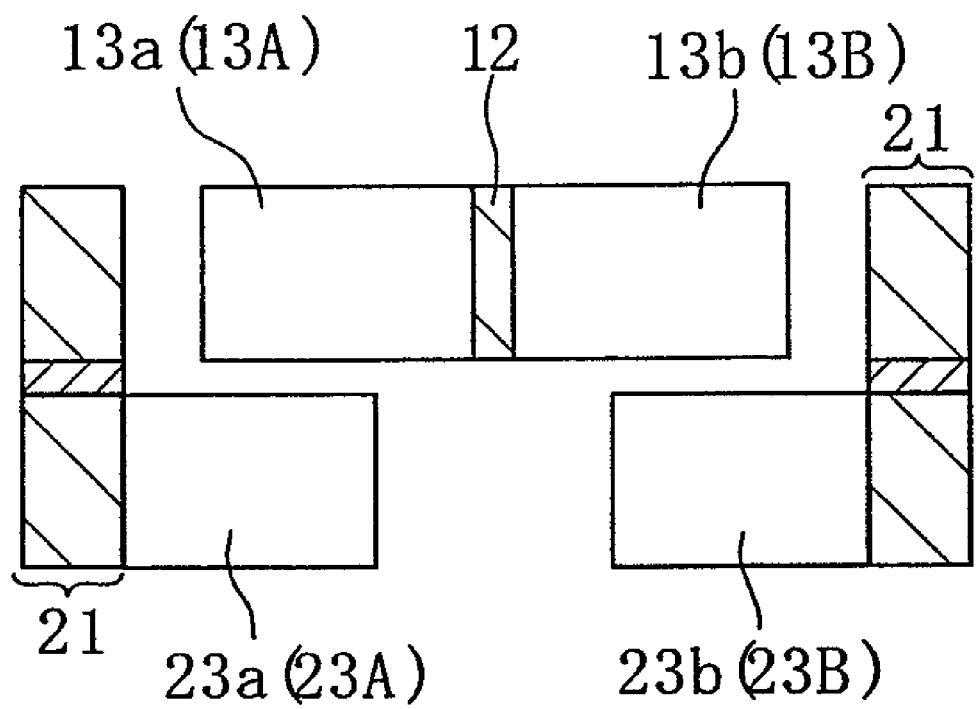
FIG. 4 is a sectional view along a line IV-IV in FIG. 1.

FIGS. 1 to 4 show a micromirror element X1 according to a first embodiment of the present invention. FIG. 1 is a plan view of the micromirror element X1, FIG. 2 is a partial plan view of the micromirror element X1, and FIGS. 3 and 4 are sectional views along a line III-III and a line IV-IV respectively.

The micromirror element X1 comprises an oscillation section 10, a frame 21, a torsional joining section 22, and comb-tooth electrodes 23A, 23B, and is manufactured using bulk micromachining technology, such as MEMS technology, by machining a material substrate, which is a so-called SOI (silicon on insulator) substrate. The material substrate has a laminated structure constituted of a first silicon layer and second silicon layer, and an insulation layer provided between the silicon layers. Each silicon layer is provided with a predetermined conductivity by means of impurity doping. The aforementioned various regions of the micromirror element X1 are mainly formed on the first silicon layer and/or the second silicon layer, and in order to facilitate understanding of the drawing, the regions originating from the first silicon layer which protrude toward the paper surface from the insulation layer are illustrated with diagonal shading in FIG. 1. FIG. 2 shows the constitutions originating from the second silicon layer of the micromirror element X1.

The oscillation section 10 comprises a mirror supporting portion 11, an arm section 12, and comb-tooth electrodes 13A, 13B.

The mirror supporting portion 11 originates from the first silicon layer, and a mirror surface 11a having a light reflecting function is provided on the surface thereof. The mirror surface 11a has a laminated structure constituted of a Cr layer deposited on the first silicon layer and an Au layer deposited on the Cr layer, for example. The mirror supporting portion 11 and mirror surface 11a constitute a movable functional section of the present invention. A length L1 shown in FIG. 1 of the mirror supporting portion 11, and accordingly the movable functional section, is between 20 and 300 μm, for example.

The arm section 12 originates mainly on the first silicon layer, and extends from the mirror supporting portion 11. A length L2 of the arm section 12 shown in FIG. 1 is between 10 and 100 μm, for example.

The comb-tooth electrode 13A is constituted of a plurality of electrode teeth 13a. The plurality of electrode teeth 13a extend individually from the arm section 12 at intervals from each other in the extension direction of the arm section 12. The comb-tooth electrode 13B is constituted of a plurality of electrode teeth 13b. The plurality of electrode teeth 13b extend individually from the arm section 12 on the opposite side to the electrode teeth 13a at intervals from each other in the extension direction of the arm section 12. The electrode teeth 13a, 13b originate mainly on the first silicon layer. In this embodiment, as shown in FIG. 1, the extension direction of the electrode teeth 13a, 13b is orthogonal to the extension direction of the arm section 12. As shown in FIG. 3, the electrode teeth 13a stand upright in an element thickness direction H, and the electrode teeth 13b also stand upright in the element thickness direction H. Further, in this embodiment the width of the electrode teeth 13a, 13b is uniform, as shown in FIG. 1. The comb-tooth electrode 13A and its electrode teeth 13a are connected electrically to the comb-tooth electrode 13B and its electrode teeth 13b via the arm section 12.

The frame 21 originates mainly on the first and second silicon layers, and takes a form which surrounds the oscillation section 10. The region of the frame 21 which originates from the second silicon layer is shown in FIG. 2. Further, the frame 21 has a predetermined mechanical strength for supporting the structure within the frame 21. A length L3 of the frame 21 shown in FIG. 1 is between 5 and 50 μm, for example.

The torsional joining section 22 is constituted of a pair of torsion bars 22a. The torsion bars 22a originate mainly on the first silicon layer, and are connected to the arm section 12 of the oscillation section 10 and the region of the frame 21 originating from the first silicon layer, thereby linking these components. The region of the frame 21 originating from the first silicon layer and the arm section 12 are electrically connected by the torsion bars 22a. Further, as shown in FIG. 3, the torsion bars 22a are thinner than the arm section 12 in the element thickness direction H, and also thinner than the region of the frame 21 originating from the first silicon layer. The torsional joining section 22 constituted of the pair of torsion bars 22a defines an oscillation axis A1 for the oscillating operation of the oscillation section 10 and its mirror supporting portion 11. The oscillation axis A1 is orthogonal to a direction D shown by the arrow in FIG. 1, or in other words the extension direction of the arm section 12. Accordingly, the extension direction of the electrode teeth 13a, 13b described above, which extend from the arm section 12 in an orthogonal direction to the extension direction of the arm section 12, is parallel to the oscillation axis A1. The oscillation axis A1 preferably passes through or close to the center of gravity of the oscillation section 10.

In this embodiment, a set of torsion bars formed in parallel on the first silicon layer may be provided in place of the torsion bars 22a. In this case, the gap between the set of torsion bars preferably increases steadily from the frame 21 toward the arm section 12. In the micromirror element X1, the oscillation axis A1 may be defined by providing two sets of two such parallel torsion bars in place of the pair of torsion bars 22a. This also applies to the micromirror elements to be described hereafter.

The comb-tooth electrode 23A is a region for generating electrostatic attraction in cooperation with the comb-tooth electrode 13A, and is constituted of a plurality of electrode teeth 23a. The plurality of electrode teeth 23a extend individually from the frame 21 at intervals from each other in the extension direction of the arm section 12. Further, the comb-tooth electrode 23A originates mainly on the second silicon layer, and as shown in FIG. 2, is fixed to the region of the frame 21 originating from the second silicon layer. In this embodiment, as shown in FIG. 1, the extension direction of the electrode teeth 23a is orthogonal to the extension direction of the arm section 12 and parallel to the oscillation axis A1. Also in this embodiment, as shown in FIG. 1, the width of the electrode teeth 23a is uniform, and as shown in FIG. 3, the electrode teeth 23a stand upright in the element thickness direction H.

The comb-tooth electrode 23A constitutes a driving mechanism together with the comb-tooth electrode 13A. As shown in FIGS. 3 and 4, the comb-tooth electrodes 13A, 23A are positioned at different heights when the oscillation section 10 is inoperative, for example. Further, the electrode teeth 13a, 23a of the comb-tooth electrodes 13A, 23A are offset from each other so that the comb-tooth electrodes 13A, 23A do not contact each other during the oscillating operation of the oscillation section 10. In this embodiment, the distances between two adjacent electrode teeth 13a are all the same, and the distances between two adjacent electrode teeth 23a are all the same. Further, the electrode teeth 13a positioned between two electrode teeth 23a in the extension direction of the arm section 12 are positioned centrally between the two electrode teeth 23a.

The comb-tooth electrode 23B is a region for generating electrostatic attraction in cooperation with the comb-tooth electrode 13B, and is constituted of a plurality of electrode teeth 23b. The plurality of electrode teeth 23b extend individually from the frame 21 at intervals from each other in the extension direction of the arm section 12. Further, the comb-tooth electrode 23B originates mainly on the second silicon layer, and as shown in FIG. 2, is fixed to the region of the frame originating from the second silicon layer. The comb-tooth electrode 23B and its electrode teeth 23b are electrically connected to the comb-tooth electrode 23A and its electrode teeth 23a via the region of the frame 21 originating from the second silicon layer. In this embodiment, as shown in FIG. 1, the extension direction of the electrode teeth 23b is orthogonal to the extension direction of the arm section 12 and parallel to the oscillation axis A1. Also in this embodiment, as shown in FIG. 1, the width of the electrode teeth 23b is uniform, and the electrode teeth 23b stand upright in the element thickness direction H, similarly to the electrode teeth 23a.

The comb-tooth electrode 23B constitutes a driving mechanism together with the comb-tooth electrode 13B. As shown in FIG. 4, the comb-tooth electrodes 13B, 23B are positioned at different heights when the oscillation section 10 is inoperative, for example. Further, the electrode teeth 13b, 23b of the comb-tooth electrodes 13B, 23B are offset from each other so that the comb-tooth electrodes 13B, 23B do not contact each other during the oscillating operation of the oscillation section 10. In this embodiment, the distances between two adjacent electrode teeth 13b are all the same, and the distances between two adjacent electrode teeth 23b are all the same. Further, the electrode teeth 13b positioned between two electrode teeth 23b in the extension direction of the arm section 12 are positioned centrally between the two electrode teeth 23b.

FIGS. 5 and 6 show an example of a manufacturing method of the micromirror element X1. This method is one method of manufacturing the micromirror element X1 by means of bulk micromachining technology. In FIG. 6D of FIGS. 5 and 6, the formation processes of a mirror supporting portion M, arm section AR, frames F1, F2, torsion bars T1, T2, and a set of comb-tooth electrodes E1, E2 are shown as a modification of a single cross section. This single cross section is illustrated as a continuous cross section produced by modeling the cross sections of a plurality of predetermined locations included in a single micromirror element formation section on a material substrate (wafer having a multilayer structure) that is to be subjected to machining. The mirror supporting portion M corresponds to a part of the mirror supporting portion 11. The arm section AR corresponds to the arm section 12, and shows a transverse section of the arm section 12. The frames F1, F2 correspond respectively to the frame 21, and show a transverse section of the frame 21. The torsion bar T1 corresponds to the torsion bars 22a and shows a cross section in the extension direction of the torsion bars 22a. The torsion bar T2 corresponds to the torsion bars 22a, and shows a transverse section of the torsion bars 22a. The comb-tooth electrode E1 corresponds to a part of the comb-tooth electrodes 13A, 13B, and shows a transverse section of the electrode teeth 13a, 13b. The comb-tooth electrode E2 corresponds to a part of the comb-tooth electrodes 23A, 23B, and shows a transverse section of the electrode teeth 23a, 23b.

Figure 5A:
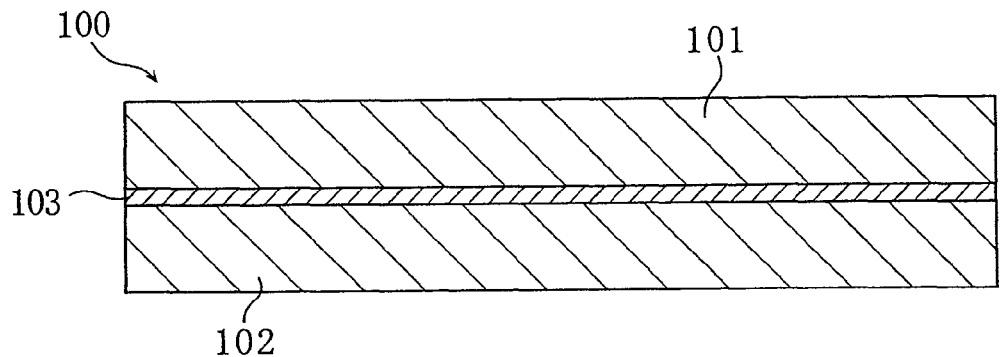
FIGS. 5A-5D show some steps of a manufacturing method for the micromirror element in FIG. 1.

To manufacture the micromirror element X1, first a material substrate 100 such as that shown in FIG. 5A is prepared. The material substrate 100 is an SOI substrate having a laminated structure constituted of silicon layers 101, 102, and an insulation layer 103 provided between the silicon layers 101, 102. The silicon layers 101, 102 are constituted of a silicon material rendered conductive by means of impurity doping. As the impurities, p-type impurities such as B or n-type impurities such as P and Sb may be employed. The insulation layer 103 is constituted of silicon oxide, for example. The thickness of the silicon layer 101 is between 10 and 100 μm, for example, the thickness of the silicon layer 102 is between 50 and 500 μm, for example, and the thickness of the insulation layer 103 is between 0.3 and 3 μm, for example.

Figure 5B:
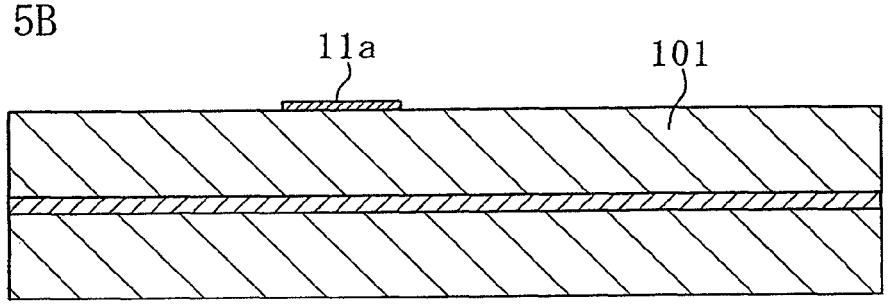

Next, as shown in FIG. 5B, the mirror surface 11a is formed on the silicon layer 101. To form the mirror surface 11a, first Cr (50 nm), and then Au (200 nm) are deposited on the silicon layer 101 using a sputtering method. Etching processing is then implemented successively on these metal films via a predetermined mask so as to form a pattern of the mirror surface 11a. An aqueous solution of potassium iodide and iodine, for example, may be used as an etching liquid for the Au, and an aqueous solution of ammonium ceric nitrate, for example, may be used as an etching liquid for the Cr.

Figure 5C:
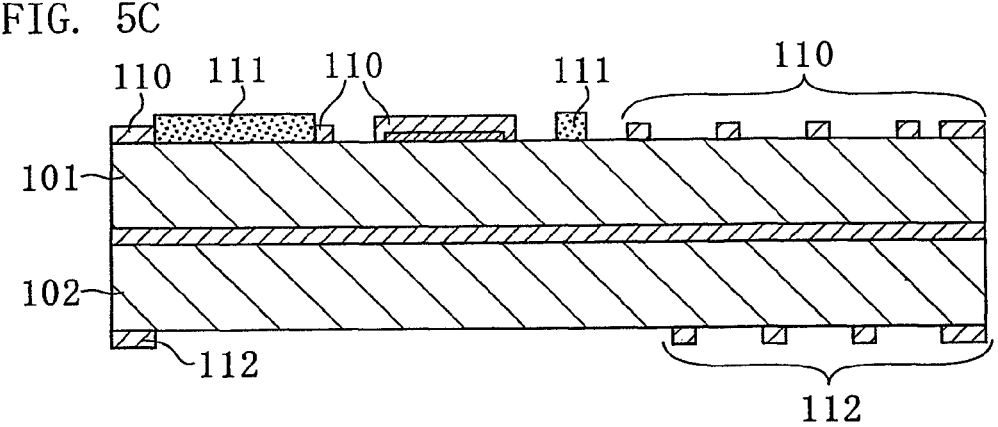

Next, as shown in FIG. 5C, an oxide film pattern 110 and a resist pattern 111 are formed on the silicon layer 101, and an oxide film pattern 112 is formed on the silicon layer 102. The oxide film pattern 110 takes a pattern form which corresponds to the oscillation section 10 (mirror supporting portion M, arm section AR, comb-tooth electrode E1) and the frame 21 (frames F1, F2). The resist pattern 111 takes a pattern form which corresponds to the two torsion bars 22a (torsion bars T1, T2). The oxide film pattern 112 takes a pattern form which corresponds to the frame 21 (frames F1, F2) and the comb-tooth electrodes 23A, 23B (comb-tooth electrode E2).

Figure 5D:
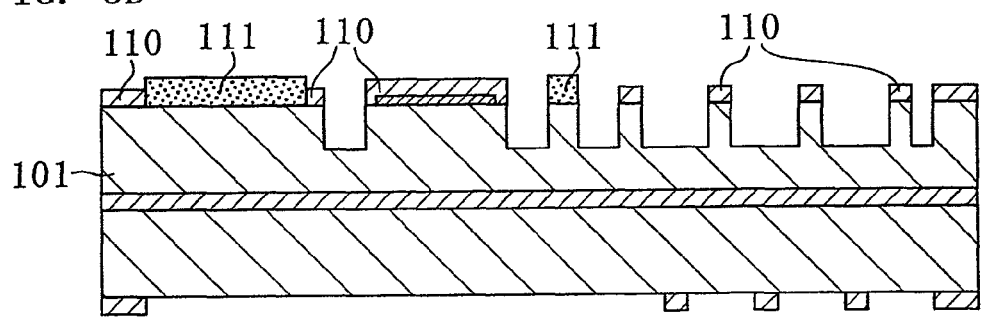

Next, as shown in FIG. 5D, etching processing to a predetermined depth is performed on the silicon layer 101 by means of DRIE (deep reactive ion etching) using the oxide film pattern 110 and the resist pattern 111 as a mask. The predetermined depth corresponds to the thickness of the torsion bars T1, T2, and is 5 μm, for example. With DRIE, favorable etching processing can be performed using a Bosch process in which etching and side wall protection are performed alternately. The Bosch process may also be employed in subsequent DRIE processing.

Figure 6A:
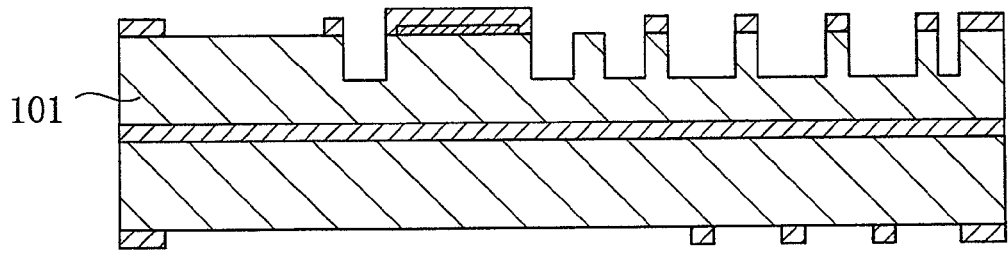
FIGS. 6A-6D show subsequent processes following on from FIG. 5.

Next, as shown in FIG. 6A, the resist pattern 111 is peeled away by the action of a stripper. AZ Remover 700 (manufactured by Clariant Japan), for example, may be used as the stripper.

Figure 6B:
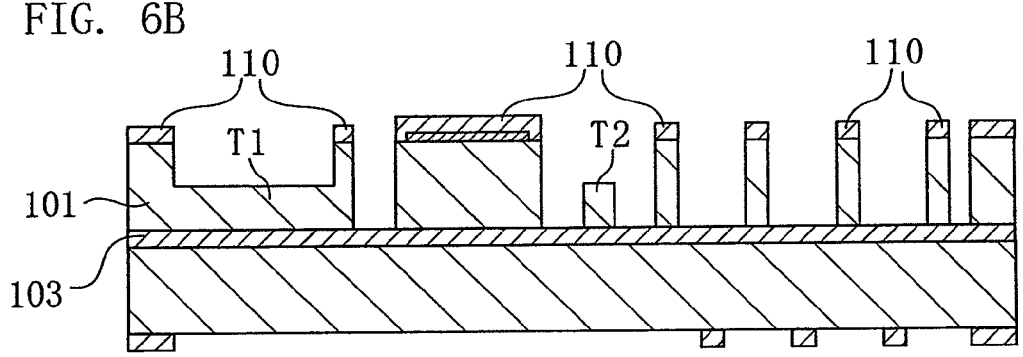

Next, as shown in FIG. 6B, etching processing through DRIE is performed on the silicon layer 101 up to the insulation layer 103, while preserving the torsion bars T1, T2, using the oxide film pattern 110 as a mask. As a result of this etching processing, the oscillation section 10 (mirror supporting portion M, arm section AR, comb-tooth electrode E1), the two torsion bars 22a (torsion bars T1, T2), and a part of the frame 21 (frames F1, F2) are molded.

Figure 6C:
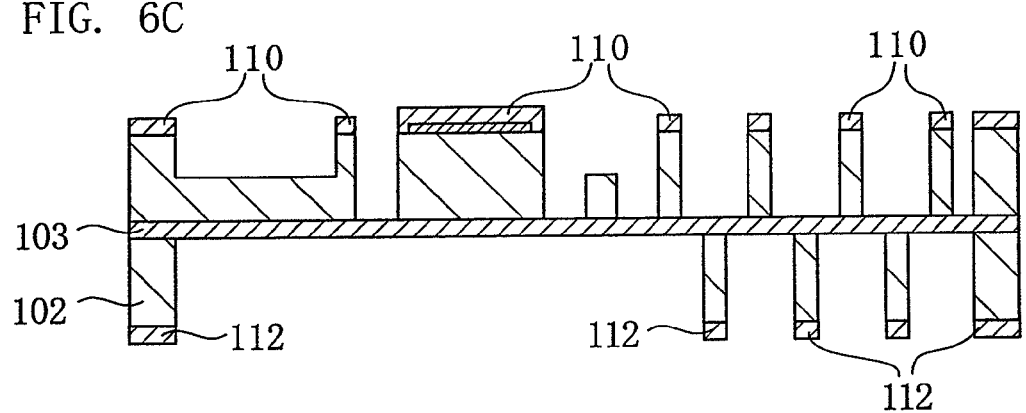

Next, as shown in FIG. 6C, etching processing through DRIE is performed on the silicon layer 102 up to the insulation layer 103 using the oxide film pattern 112 as a mask. As a result of this etching processing, a part of the frame 21 (frames F1, F2) and the comb-tooth electrodes 23A, 23B (comb-tooth electrode E2) are molded.

Figure 6D:
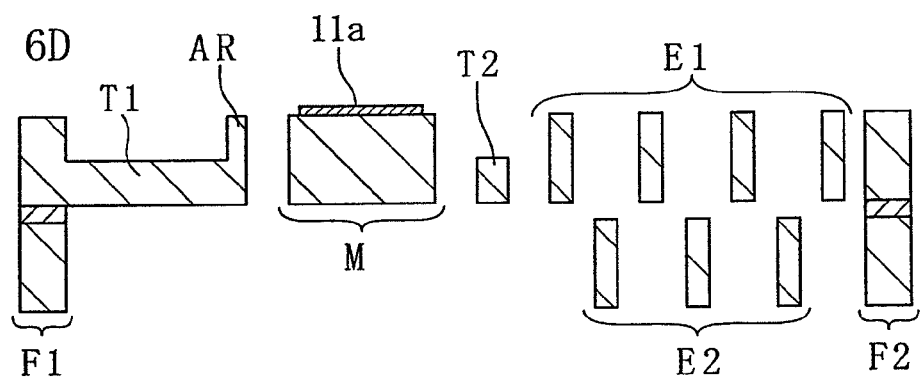

Next, as shown in FIG. 6D, the exposed locations of the insulation layer 103 and the oxide film patterns 110, 112 are removed by etching. Dry etching or wet etching may be employed as the etching method. When dry etching is employed, $CF_4$ or $CHF_3$, for example, may be employed as an etching gas. When wet etching is employed, buffered hydrofluoric acid (BHF) containing hydrofluoric acid and ammonium fluoride, for example, may be used as an etching liquid.

Through this series of processes, the mirror supporting portion M, arm section AR, frames F1, F2, torsion bars T1, T2, and the set of comb-tooth electrodes E1, E2 are molded, and thus the micromirror element X1 can be manufactured.

In the micromirror element X1, the oscillation section 10 and mirror supporting portion 11 can be rotationally displaced on the oscillation axis A1 by applying a predetermined potential as needed to the comb-tooth electrodes 13A, 13B, 23A, 23B. The application of a potential to the comb-tooth electrodes 13A, 13B can be realized via the region of the frame 21 originating from the first silicon layer, the two torsion bars 22a, and the arm section 12. The comb-tooth electrodes 13A, 13B are grounded, for example. Meanwhile, the application of a potential to the comb-tooth electrodes 23A, 23B can be realized via the region of the frame 21 originating from the second silicon layer. The region of the frame 21 originating from the second silicon layer and the region of the frame 21 originating prom the first silicon layer are separated electrically by the insulation layer (the insulation layer 103 described above, for example).

By applying a predetermined potential to each of the comb-tooth electrodes 13A, 13B, 23A, 23B such that a desired electrostatic attraction is generated between the comb-tooth electrodes 13A, 23A and between the comb-tooth electrodes 13B, 23B, the comb-tooth electrode 13A is attracted toward the comb-tooth electrode 23A, and the comb-tooth electrode 13B is attracted toward the comb-tooth electrode 23B. As a result, the oscillation section 10 and mirror supporting portion 11 perform an oscillating operation about the oscillation axis A1 so as to be rotationally displaced to an angle at which the electrostatic attraction and the sum of the torsional resistance of the two torsion bars 22a counterbalance one another. In this counterbalanced state, the comb-tooth electrodes 13A, 23A* are oriented as shown in FIG. 7, for example, and the comb-tooth electrodes 13B, 23B are oriented similarly. The amount of rotary displacement occurring during this oscillating operation can be adjusted by regulating the potential that is applied to the comb-tooth electrodes 13A, 13B, 23A, 23B. Furthermore, when the electrostatic attraction between the comb-tooth electrodes 13A, 23A and the electrostatic attraction between the comb-tooth electrodes 13B, 23B are removed, the torsion bars 22a return to their natural state such that the oscillation section 10 and mirror supporting portion 11 return to the orientation shown in FIG. 3. By driving the oscillation section 10 and mirror supporting portion 11 to tilt in this manner, the reflection direction of the light that is reflected on the mirror surface 11a provided on the mirror supporting portion 11 can be switched arbitrarily.

In the micromirror element X1, the plurality of electrode teeth 13a of the comb-tooth electrode 13A are supported on the arm section 12, which extends from the mirror supporting portion 11, at intervals from each other in the extension direction of the arm section 12, and the plurality of electrode teeth 23a of the comb-tooth electrode 23A are supported on the frame 21 at intervals from each other in the extension direction of the arm section 12. Meanwhile, the plurality of electrode teeth 13b of the comb-tooth electrode 13B are supported on the arm section 12, which extends from the mirror supporting portion 11, at intervals from each other in the extension direction of the arm section 12, and the plurality of electrode teeth 23b of the comb-tooth electrode 23B are supported on the frame 21 at intervals from each other in the extension direction of the arm section 12. These electrode teeth 13a, 13b, 23a, 23b are not supported directly on the mirror supporting portion 11. As a result, the number of electrode teeth 13a, 23a constituting the set of comb-tooth electrodes 13A, 23A and the number of electrode teeth 13b, 23b constituting the set of comb-tooth electrodes 13B, 23B are not restricted by the length of the mirror supporting portion 11 in the extension direction of the oscillation axis A1, which is orthogonal to the extension direction of the arm section 12.

Hence in the micromirror element X1, a desired number of the electrode teeth 13a, 13b, 23a, 23b can be provided regardless of the design dimension of the mirror supporting portion 11 in the oscillation axis A1 direction, and therefore a sufficient surface area to allow the electrode teeth 13a, 23a to face each other and a sufficient surface area to allow the electrode teeth 13b, 23b to face each other can be secured. With the micromirror element X1, there is no need to reduce the width or increase the extension length of the electrode teeth 13a, 23a of the set of comb-tooth electrodes 13A, 23A to the extent that the mechanical strength of the electrode teeth 13a, 23a is adversely affected in order to secure a sufficient surface area to allow the electrode teeth 13a, 23a to face each other, for example, and there is also no need to reduce the gap between teeth to the extent that difficulties arise in the manufacturing process of the element.

Hence the micromirror element X1 is suitable for achieving miniaturization by reducing the design dimension of the mirror supporting portion 11, and accordingly the entire element, in the oscillation axis A1 direction while maintaining enough driving force to drive the oscillating operation of the oscillation section 10 by providing a desired number of the electrode teeth 13a, 13b, 23a, 23b, regardless of the design dimension of the mirror supporting portion 11 in the oscillation axis A1 direction.

Figure 8:
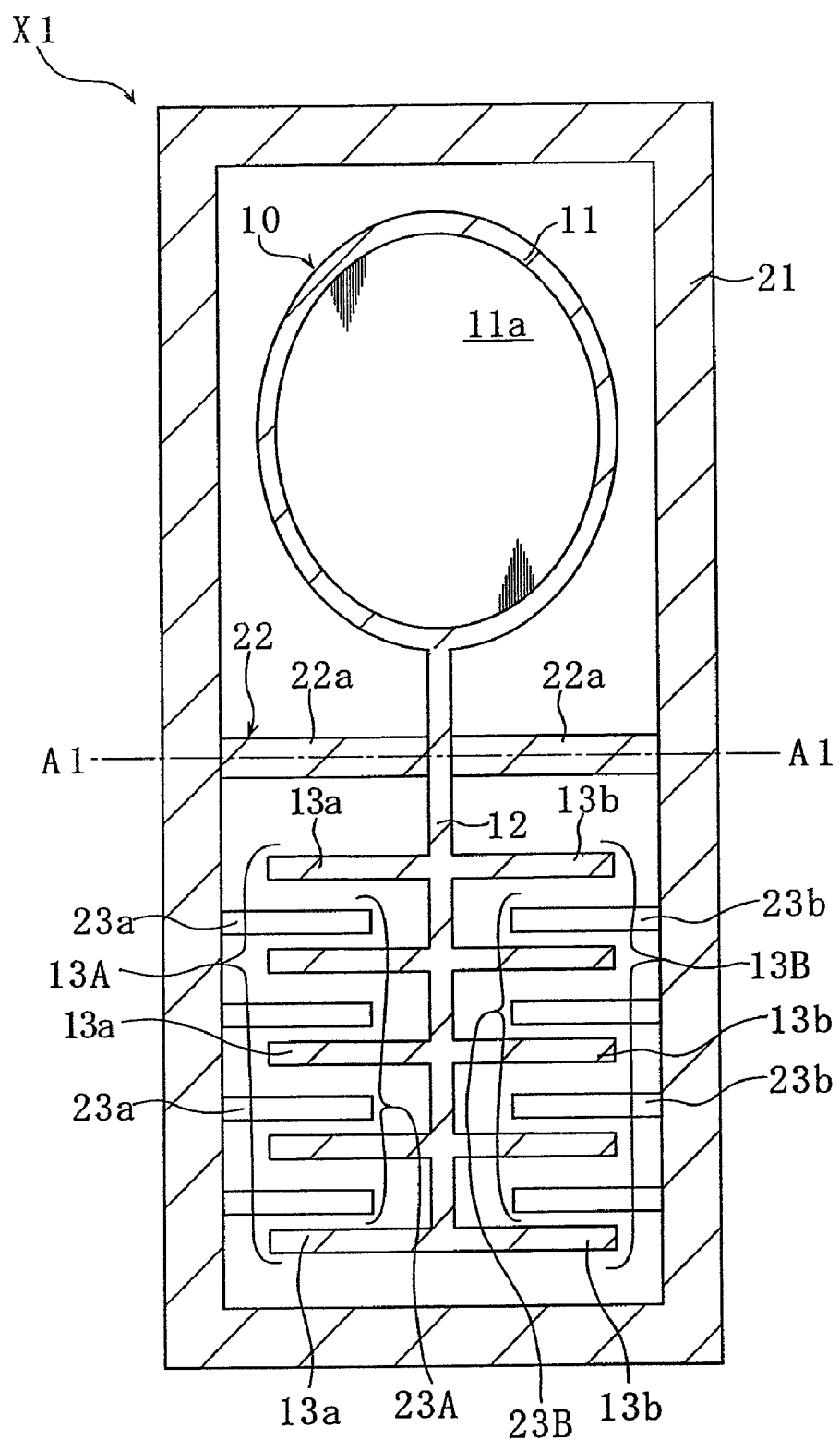
FIG. 8 is a plan view of a first modified example of the micromirror element of FIG. 1.

FIG. 8 is a plan view of a first modified example of the micromirror element X1. In this modified example, the electrode tooth 13a positioned between two adjacent electrode teeth 23a in the extension direction of the arm section 12 is offset toward the oscillation axis A1 from a central position between the two electrode teeth 23a, or the electrode tooth 23a positioned between two adjacent electrode teeth 13a in the extension direction of the arm section 12 is offset away from the oscillation axis A1 from a central position between the two electrode teeth 13a. Additionally, the electrode tooth 13b positioned between two adjacent electrode teeth 23b in the extension direction of the arm section 12 is offset toward the oscillation axis A1 from a central position between the two electrode teeth 23b, or the electrode tooth 23b positioned between two adjacent electrode teeth 13b in the extension direction of the arm section 12 is offset away from the oscillation axis A1 from a central position between the two electrode teeth 13b.

Figure 9:
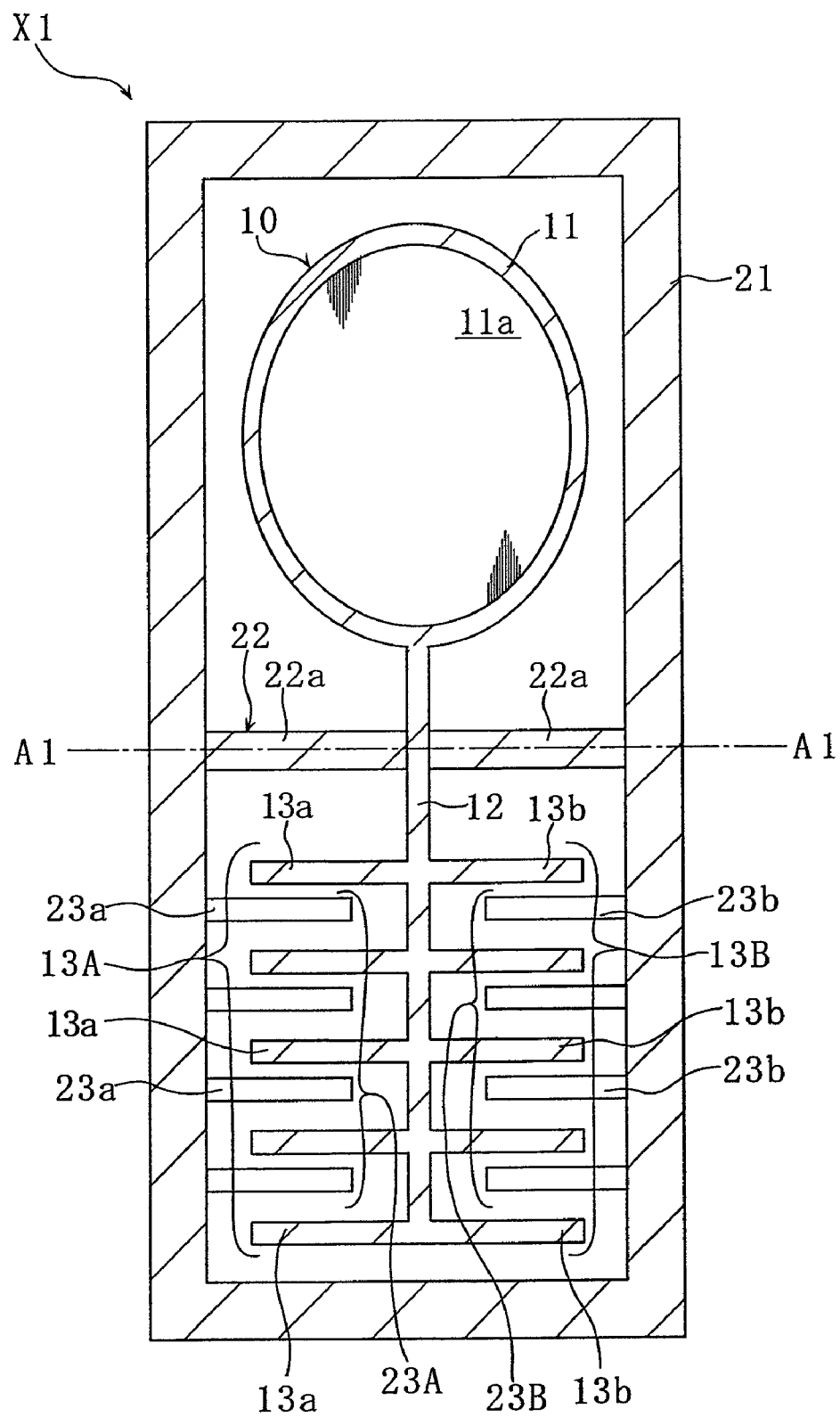
FIG. 9 is a plan view of a second modified example of the micromirror element of FIG. 1.

FIG. 9 is a plan view of a second modified example of the micromirror element X1. In this modified example, the electrode tooth 13a positioned between two adjacent electrode teeth 23a in the extension direction of the arm section 12 is offset away from the oscillation axis A1 from a central position between the two electrode teeth 23a, or the electrode tooth 23a positioned between two adjacent electrode teeth 13a in the extension direction of the arm section 12 is offset toward the oscillation axis A1 from a central position between the two electrode teeth 23a. Additionally, the electrode tooth 13b positioned between two adjacent electrode teeth 23b in the extension direction of the arm section 12 is offset away from the oscillation axis A1 from a central position between the two electrode teeth 23b, or the electrode tooth 23b positioned between two adjacent electrode teeth 13b in the extension direction of the arm section 12 is offset toward the oscillation axis A1 from a central position between the two electrode teeth 13b.

The constitution of the first and second modified examples may be favorable for suppressing the occurrence of a so-called pull-in phenomenon during driving of the element in the set of comb-tooth electrodes 13A and 23A, and the set of comb-tooth electrodes 13B and 23B. As described above, during driving of the element, a desired electrostatic attraction is generated between the comb-tooth electrodes 13A and 23A and between the comb-tooth electrodes 13B and 23B. As a result, the comb-tooth electrode 13A is attracted toward the comb-tooth electrode 23A and the comb-tooth electrode 13B is attracted toward the comb-tooth electrode 23B. With the micromirror element X1, in which the comb-tooth electrodes 13A and 23A are constituted as shown in FIGS. 1, 3, and 4, when the comb-tooth electrode 13A is in a state of attraction toward the comb-tooth electrode 23A, the distance between one electrode tooth 13a and the electrode tooth 23a adjacent to the electrode tooth 13a on the outside of the electrode tooth 13a in relation to the oscillation axis A1 may be shorter or longer than the distance between this electrode tooth 13a and the other adjacent electrode tooth 23a on the inside of the electrode tooth 13a in relation to the oscillation axis A1, depending on the position of the oscillation axis A1 in the element thickness direction H. When shorter, the electrostatic attraction (first electrostatic attraction) between the electrode tooth 13a and the outside electrode tooth 23a tends to be greater than the electrostatic attraction (second electrostatic attraction) between the electrode tooth 13a and the inside electrode tooth 23a. When the first electrostatic attraction is greater than the second electrostatic attraction by a predetermined degree or more, the electrode tooth 13a and the outside electrode tooth 23a are attracted incorrectly, and hence the pull-in phenomenon is likely to occur. When the second electrostatic attraction is greater than the first electrostatic attraction by a predetermined degree or more, the electrode tooth 13a and the inside electrode tooth 23a are attracted incorrectly, and hence the pull-in phenomenon is likely to occur. Similarly, with the micromirror element X1 in which the comb-tooth electrodes 13B, 23B are constituted as shown in FIGS. 1 and 4, the pull-in phenomenon may occur in the comb-tooth electrodes 13B and 23B. The pull-in phenomenon is undesirable since it damages the oscillating characteristic of the element.

Conversely, in the first and second modified examples, in which the electrode tooth 13a positioned between two adjacent electrode teeth 23a in the extension direction of the arm section 12 is offset from a central position between the two electrodes 23a toward the inside or outside electrode tooth 23a when the oscillation section 10 has not been rotationally displaced, it is possible to substantially equalize the distance between the electrode tooth 13a and the outside electrode tooth 23a and the distance between the electrode tooth 13a and the inside electrode tooth 23a, when the oscillation section 10 is rotationally displaced such that the comb-tooth electrode 13A is attracted toward the comb-tooth electrodes 23A, 23B, by setting the amount of electrode tooth offset appropriately in accordance with the position of the oscillation axis A1 in the element thickness direction H. In this case, occurrence of the pull-in phenomenon in the comb-tooth electrodes 13A, 23A can be suppressed. Likewise, it is possible to suppress occurrence of the pull-in phenomenon in the comb-tooth electrodes 13B, 23B by means of the constitution of the first and second modified examples.

Figure 10:
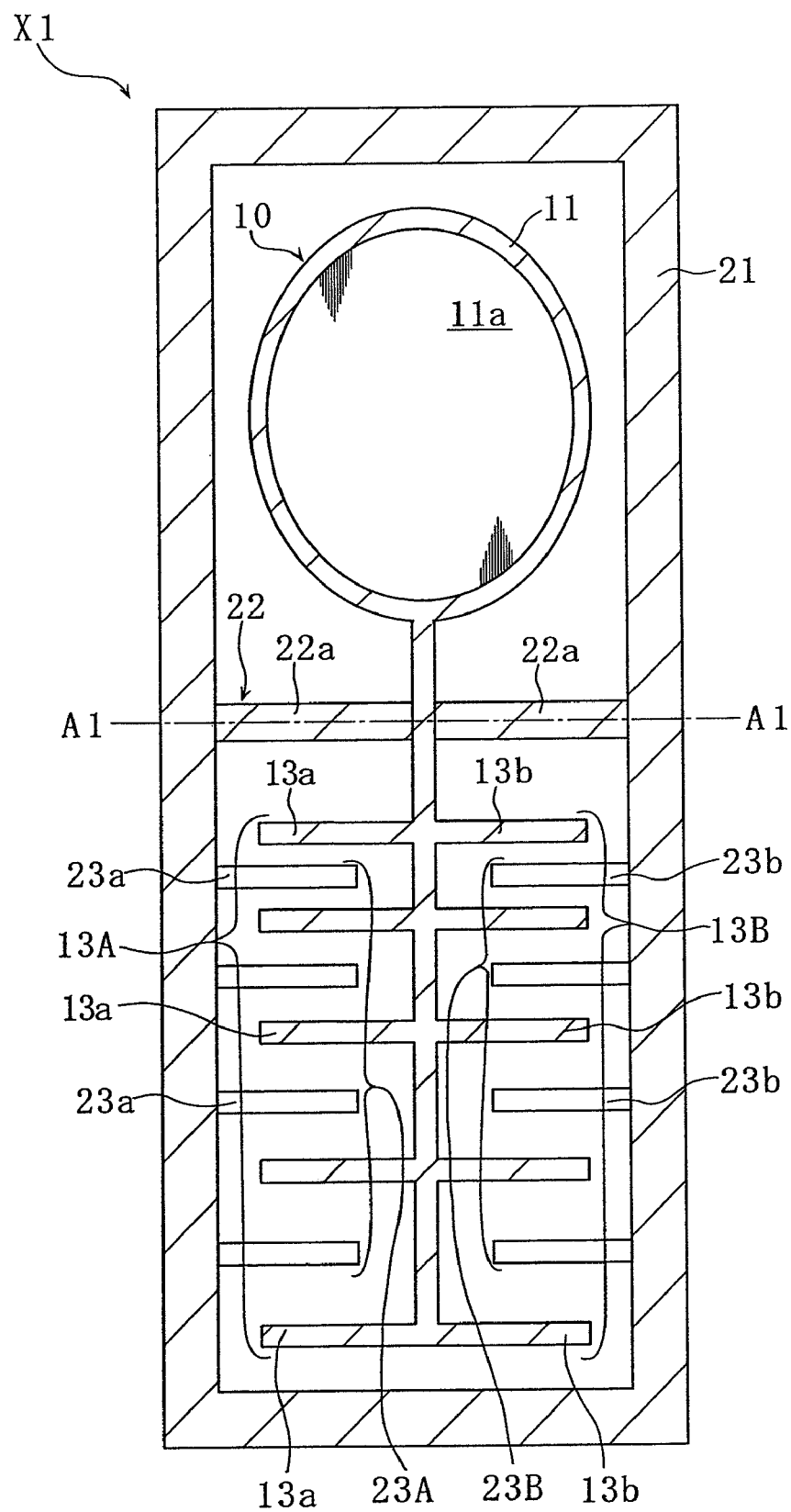
FIG. 10 is a plan view of a third modified example of the micromirror element of FIG. 1.

FIG. 10 is a plan view of a third modified example of the micromirror element X1. In this modified example, the dimension of the arm section 12 and the dimension of the frame 21 in the extension direction of the arm section 12 are increased, and the distance between two adjacent electrode teeth 13a, the distance between two adjacent electrode teeth 13b, the distance between two adjacent electrode teeth 23a, and the distance between two adjacent electrode teeth 23b are lengthened steadily away from the oscillation axis A1.

The amount of displacement of the electrode teeth 13a, 13b in the electrode tooth interval direction (the extension direction of the arm section 12) increases steadily away from the oscillation axis A1 during the oscillating operation of the oscillation section 10, and hence this modified example is favorable in that when the oscillation section 10 is rotationally displaced during driving of the element such that the comb-tooth electrodes 13A, 13B are attracted toward the comb-tooth electrodes 23A and 23B respectively, the distances between the electrode teeth 13a and 23a can all be made approximately equal, and the distances between the electrode teeth 13b, 23b can all be made approximately equal. By making all of the distances between the electrode teeth 13a and 23a approximately equal during driving of the element, a uniform electrostatic attraction can be generated over the entirety of the comb-tooth electrodes 13A, 23A during driving of the element. Likewise, by making all of the distances between the electrode teeth 13b and 23b approximately equal during driving of the element, a uniform electrostatic attraction can be generated over the entirety of the comb-tooth electrodes 13B and 23B during driving of the element.

Figure 11:
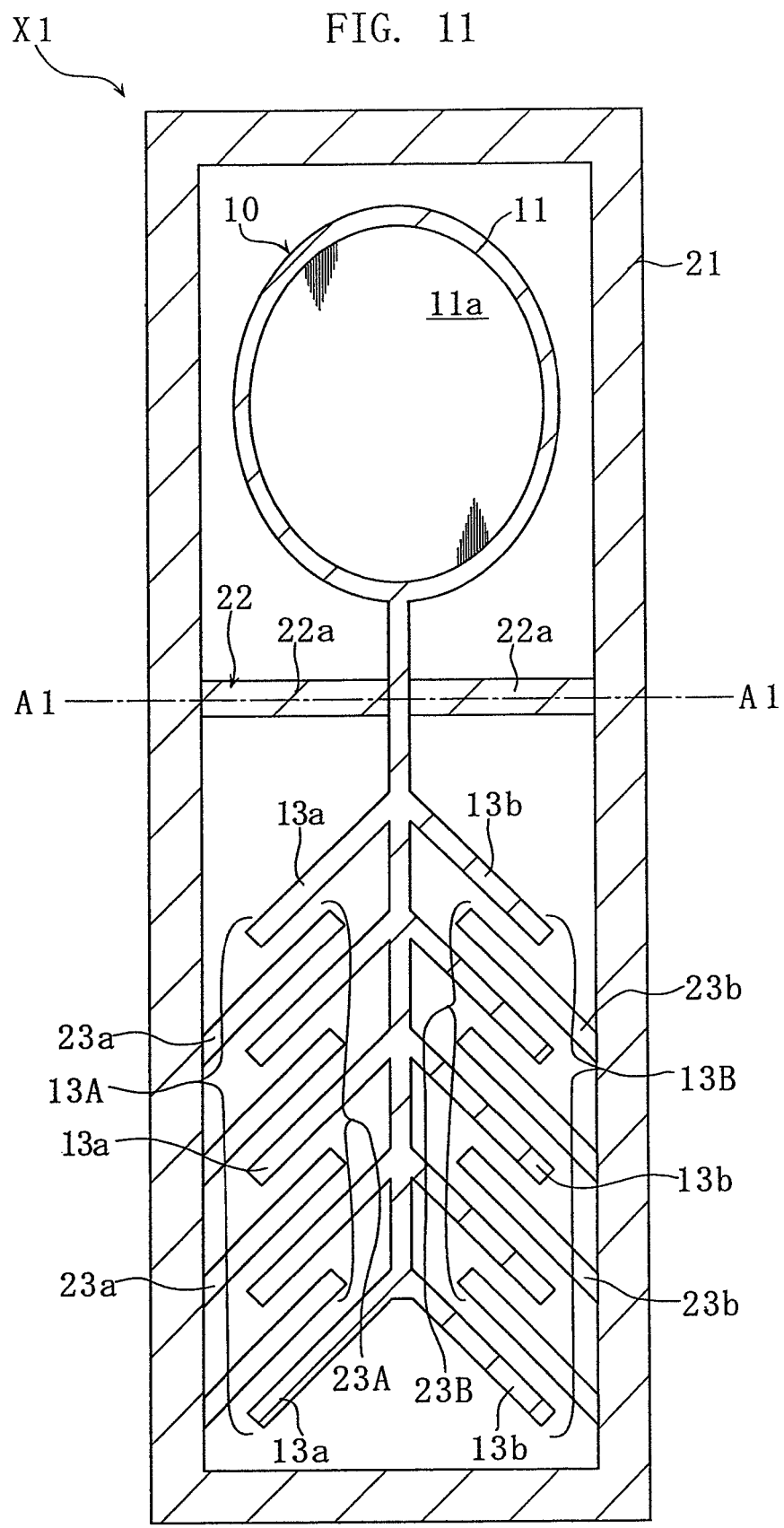
FIG. 11 is a plan view of a fourth modified example of the micromirror element of FIG. 1.

FIG. 11 is a plan view of a fourth modified example of the micromirror element X1. In this modified example, the extension direction of the plurality of electrode teeth 13a, 13b of the comb-tooth electrodes 13A, 13B and the extension direction of the plurality of electrode teeth 23a, 23b of the comb-tooth electrodes 23A, 23B are not orthogonal to the extension direction of the arm section 12. Instead, the extension directions of the electrode teeth 13a, 23a are parallel to one another, and the extension directions of the electrode teeth 13b, 23b are parallel to one another. An acute angle formed by the extension direction of the electrode teeth 13a, 13b, 23a, 23b and the extension direction of the arm section 12 is 45°, for example. The micromirror element X1 may be provided with the comb-tooth electrodes 13A, 13B, 23A, 23B constituted in this manner.

Figure 12:
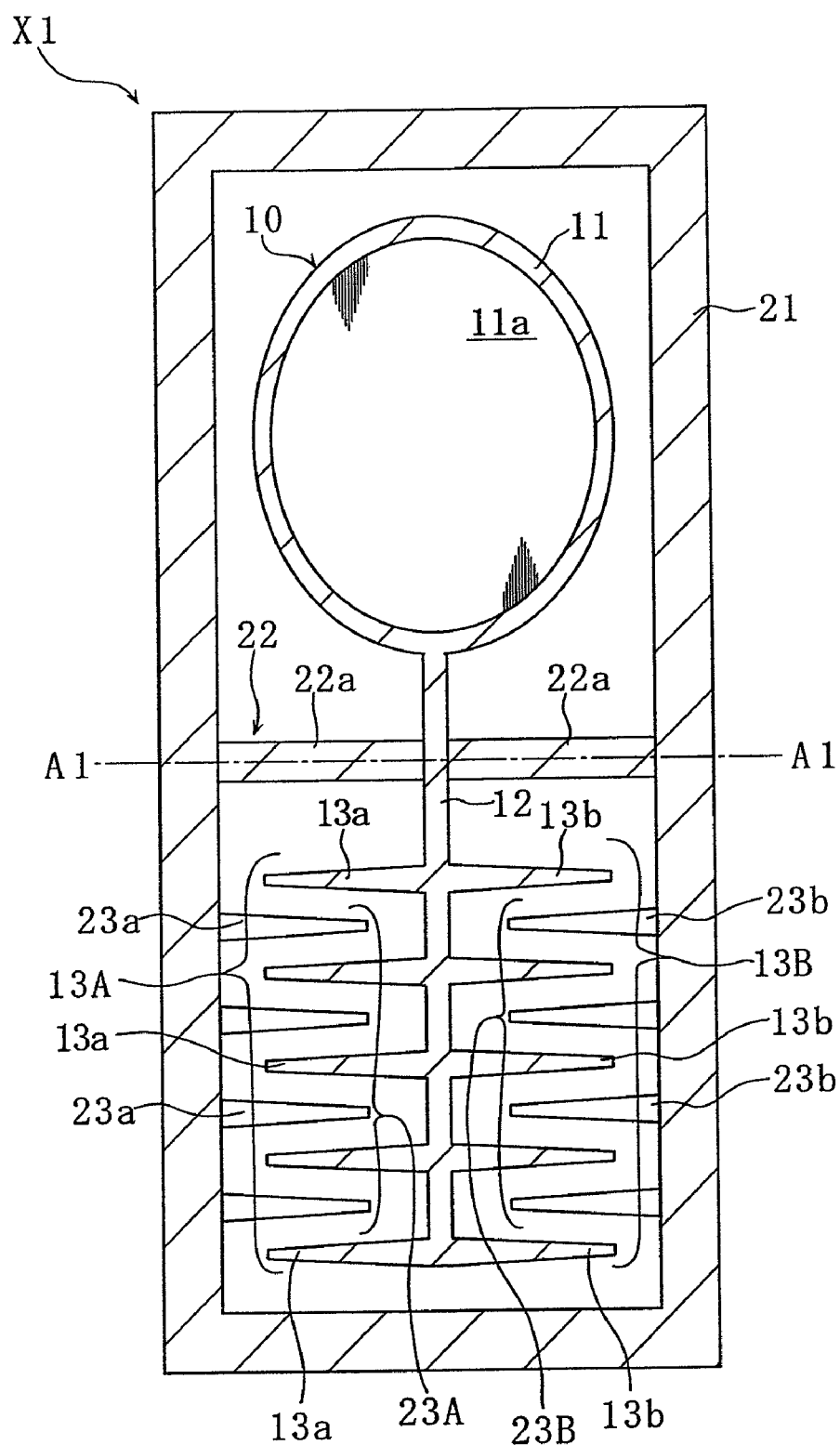
FIG. 12 is a plan view of a fifth modified example of the micromirror element of FIG. 1.

FIG. 12 is a plan view of a fifth modified example of the micromirror element X1. In this modified example, the two side faces of the electrode teeth 13a, 13b are non-perpendicular to the side face of the arm section 12, and the width of the electrode teeth 13a, 13b decreases steadily away from the arm section 12. Further, the two side faces of the electrode teeth 23a, 23b are non-perpendicular to the side face of the frame 21, and the width of the electrode teeth 23a, 23b decreases steadily away from the frame 21.

This constitution is favorable in that when the oscillation section 10 is rotationally displaced during driving of the element such that the comb-tooth electrodes 13A and 13B are attracted toward the comb-tooth electrodes 23A and 23B respectively, the electrode teeth 13a and 23a and the electrode teeth 13b and 23b can be prevented from coming into excessively close proximity. By preventing the electrode teeth 13a and 23a from coming into excessively close proximity during driving of the element, occurrence of the pull-in phenomenon in the comb-tooth electrodes 13A and 23A can be suppressed during driving of the element. Likewise, by preventing the electrode teeth 13b and 23b from coming into excessively close proximity during driving of the element, occurrence of the pull-in phenomenon in the comb-tooth electrodes 13B, 23B can be suppressed during driving of the element.

Figure 13:
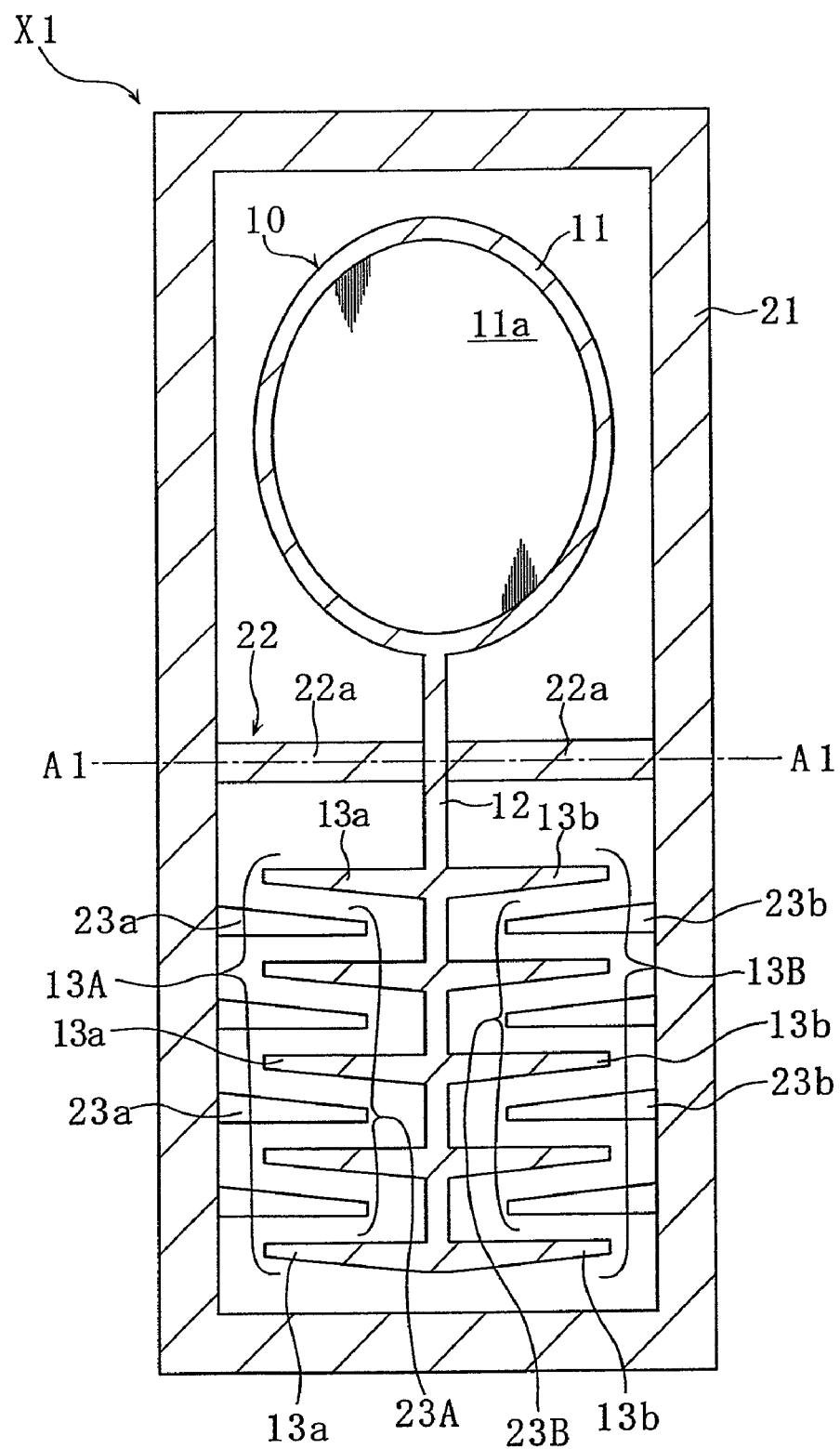
FIG. 13 is a plan view of a sixth modified example of the micromirror element of FIG. 1.

FIG. 13 is a plan view of a sixth modified example of the micromirror element X1. In this modified example, the side face of the electrode teeth 13a, 13b facing the mirror supporting portion 11 side is perpendicular to the side face of the arm section 12, the other side face of the electrode teeth 13a, 13b is non-perpendicular to the side face of the arm section 12, and the width of the electrode teeth 13a, 13b decreases steadily away from the arm section 12. Further, the side face of the electrode teeth 23a, 23b facing the mirror supporting portion 11 side is non-perpendicular to the side face of the frame 21, the other side face of the electrode teeth 23a, 23b is perpendicular to the side face of the frame 21, and the width of the electrode teeth 23a, 23b decreases steadily away from the frame 21.

This constitution is favorable in that when the oscillation section 10 is rotationally displaced during driving of the element to attract the comb-tooth electrodes 13A and 13B toward the comb-tooth electrodes 23A and 23B respectively, in particular the electrode teeth 13a and their outside electrode teeth 23a, and the electrode teeth 13b and their outside electrode teeth 23b, can be prevented from coming into excessively close proximity.

Figure 14:
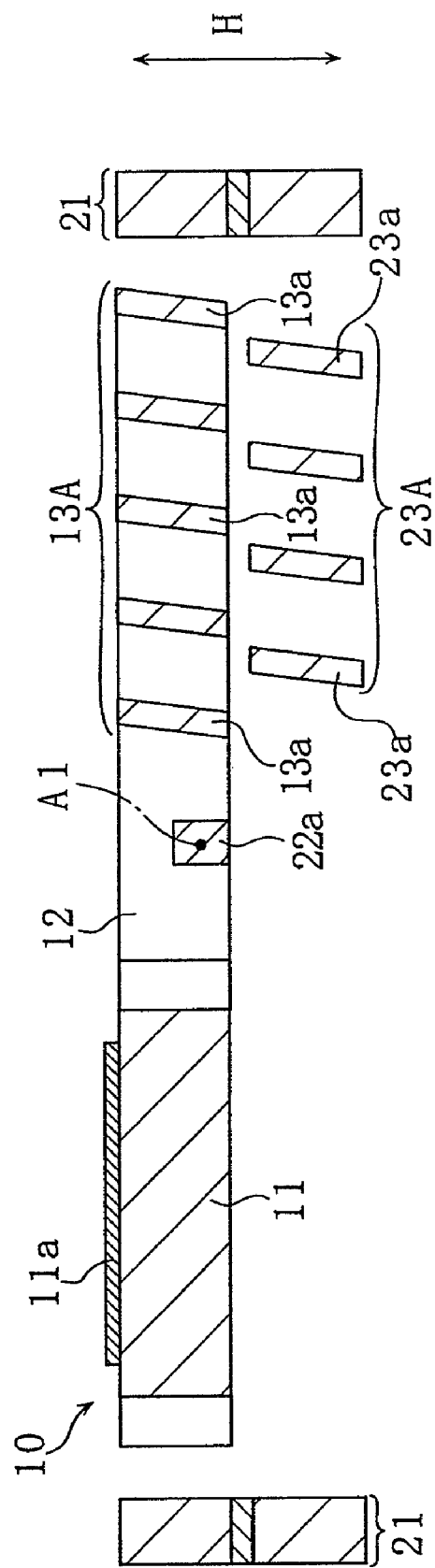
FIG. 14 is a plan view of a seventh modified example of the micromirror element of FIG. 1.

FIG. 14 is a sectional view, corresponding to the line III-III in FIG. 1, of a seventh modified example of the micromirror element X1. In this modified example, the standing direction of the electrode teeth 13a when the oscillation section 10 is inoperative is inclined in relation to the element thickness direction H. More specifically, the electrode teeth 13a are inclined so as to move steadily closer to the mirror supporting portion 11 as they approach the electrode teeth 23a. Further, the electrode teeth 23a are inclined so as to move steadily further away from the mirror supporting portion 11 as they approach the electrode teeth 13a. In this modified example, the electrode teeth 13b, 23b are inclined in a similar fashion to the electrode teeth 13a, 23a.

The orientation of the comb-tooth electrode 13A to the comb-tooth electrode 23A in case of the oscillation section is inoperative differs from the orientation of the comb-tooth electrode 13A to the comb-tooth electrode 23A in case of the oscillation section 10 is rotationally displaced such that the comb-tooth electrode 13A is attracted toward the comb-tooth electrode 23A. When the comb-tooth electrodes 13A and 23A have the constitution shown in FIGS. 1, 3, and 4, this variation in orientation is comparatively large. In contrast, the comb-tooth electrodes 13A and 23A of this modified example comprise the electrode teeth 13a and 23a, which are pre-inclined in the direction in which the electrode teeth 13a incline when the comb-tooth electrode 13A is attracted toward the comb-tooth electrode 23A, and hence variation in the orientation between operative and inoperative periods is comparatively small. Likewise, the comb-tooth electrodes 13B and 23B of this modified example comprise the electrode teeth 13b and 23b, which are pre-inclined in the direction in which the electrode teeth 13b incline when the comb-tooth electrode 13B is attracted toward the comb-tooth electrode 23B, and hence variation in the orientation between operative and inoperative periods is comparatively small. By suppressing orientation variation in this manner, a stable electrostatic attraction can be generated between the comb-tooth electrodes 13A, 23A and between the comb-tooth electrodes 13B and 23B.

Figure 15:
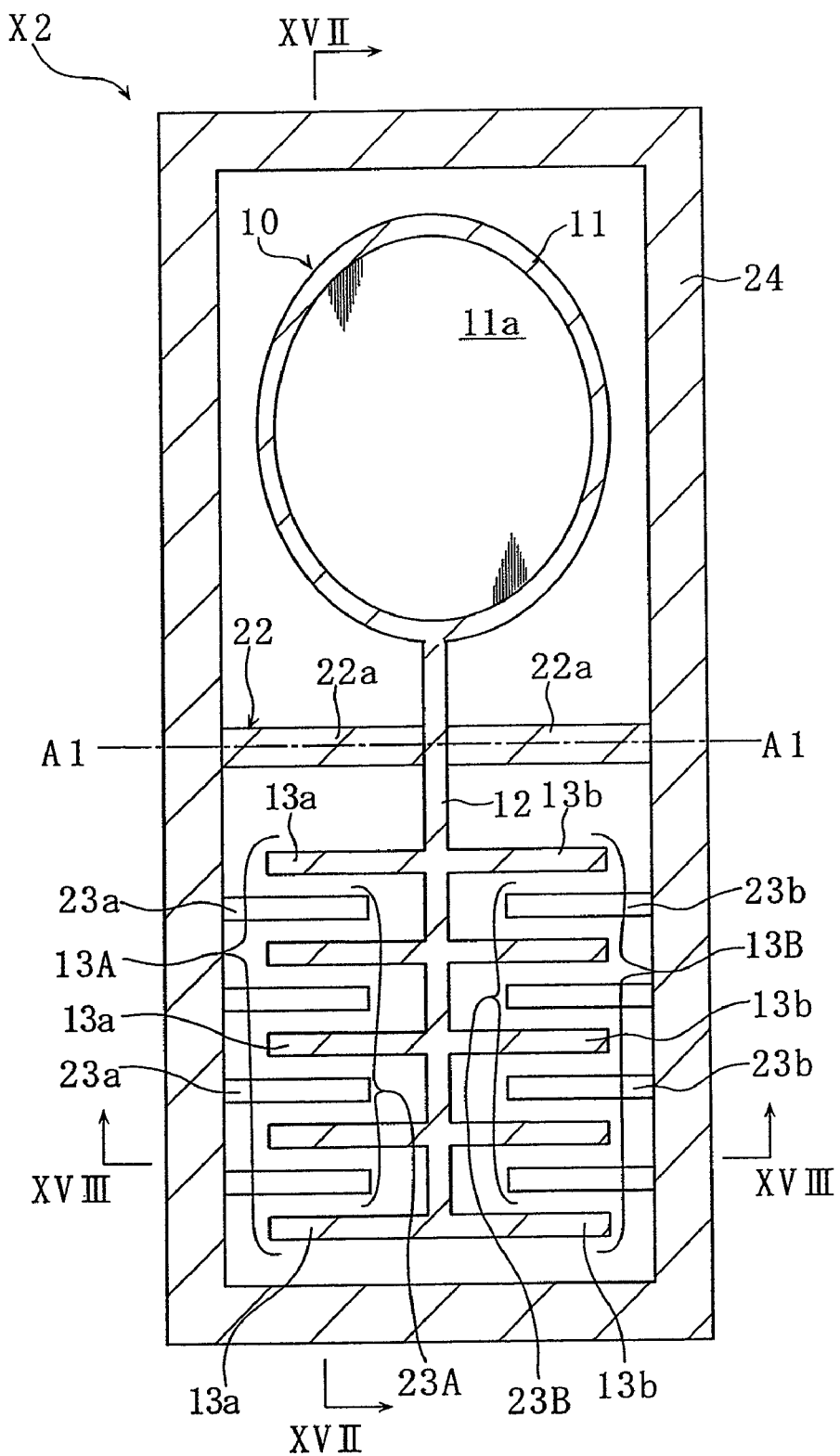
FIG. 15 is a plan view of a micromirror element according to a second embodiment of the present invention.
Figure 16:
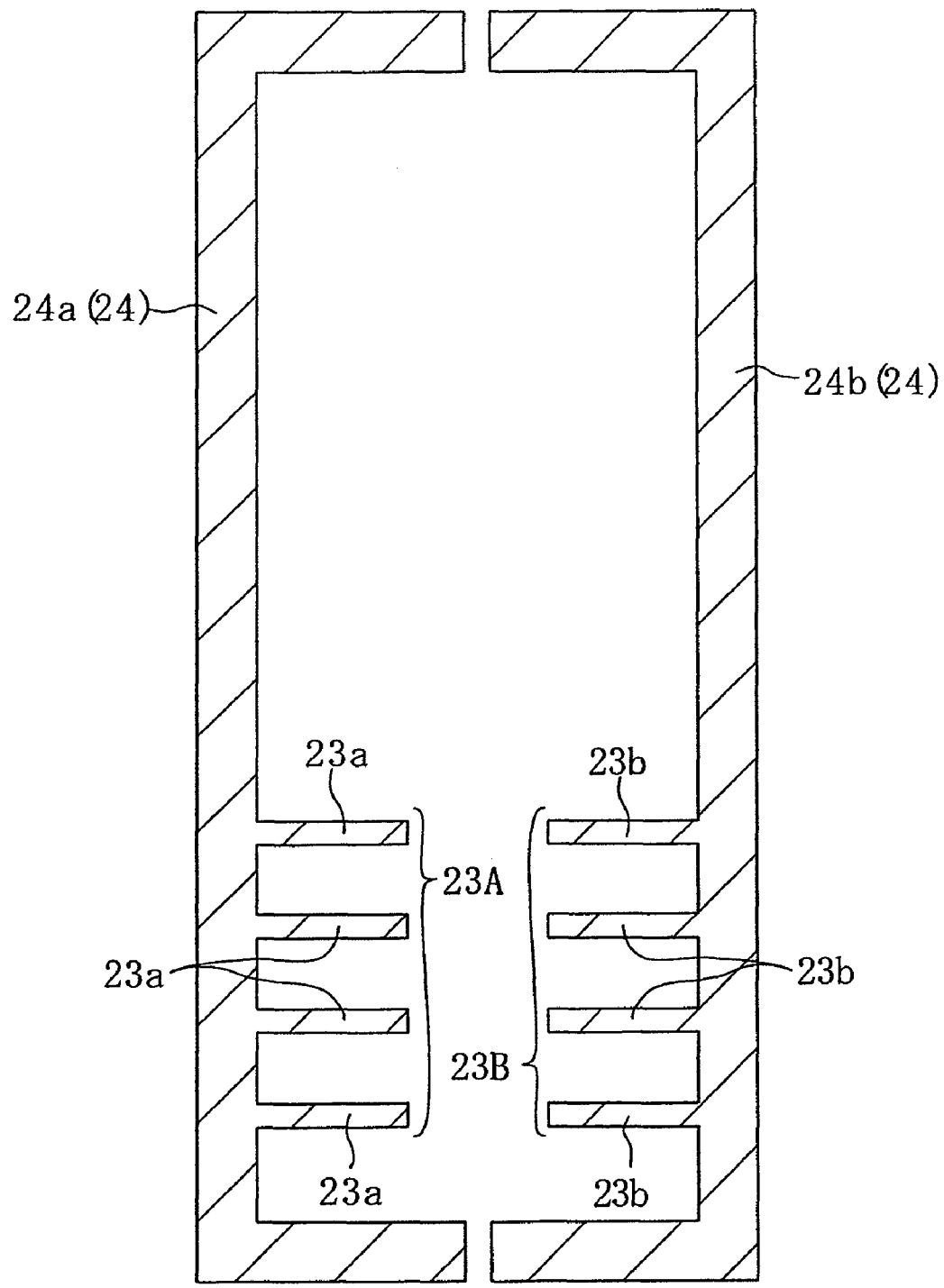
FIG. 16 is a partial plan view of the micromirror element shown in FIG. 15.
Figure 17:
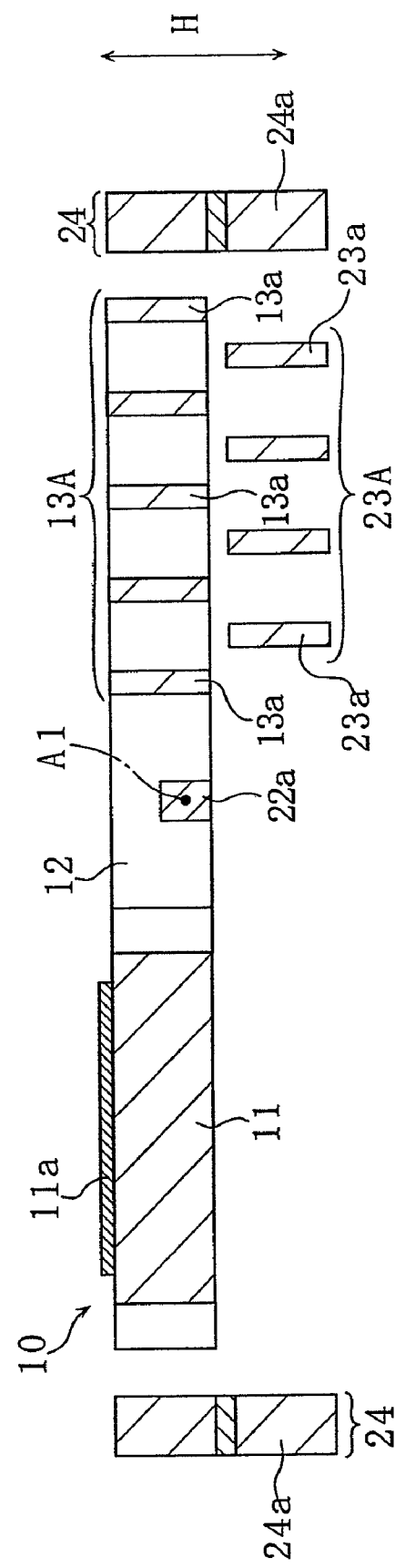
FIG. 17 is a sectional view along a line XVII-XVII in FIG. 15.
Figure 18:
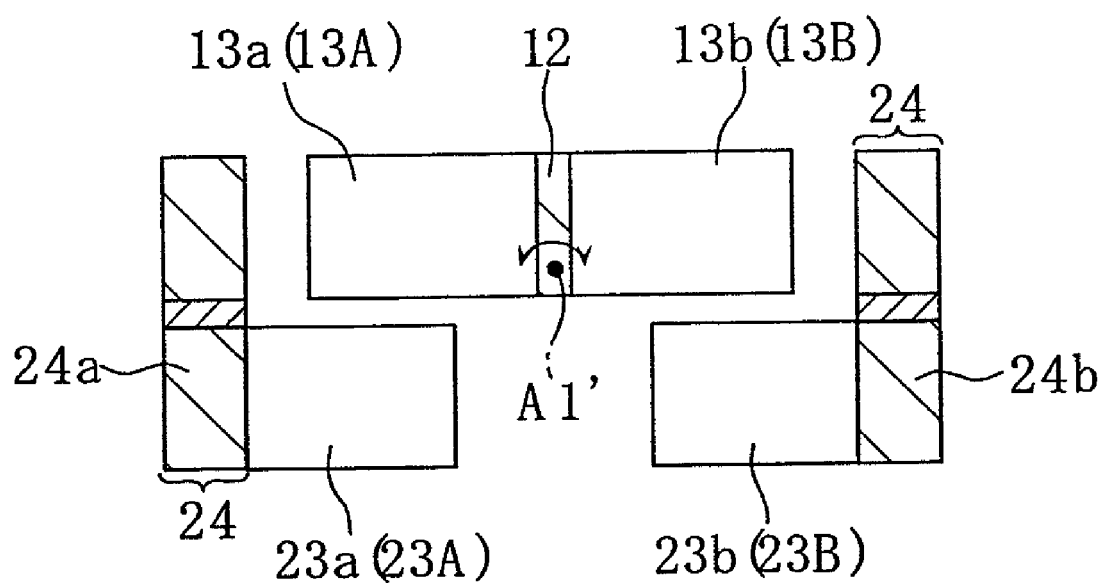
FIG. 18 is a sectional view along a line XVIII-XVIII in FIG. 15.

FIGS. 15 to 18 show a micromirror element X2 pertaining to a second embodiment of the present invention. FIG. 15 is a plan view of the micromirror element X2, FIG. 16 is a partial plan view of the micromirror element X2, and FIGS. 17 and 18 are sectional views along a line XVII-XVII and a line XVIII-XVIII of FIG. 15, respectively.

The micromirror element X2 comprises an oscillation section 10, a frame 24, a torsional joining section 22, and comb-tooth electrodes 23A, 23B. The micromirror element X2 differs from the micromirror element X1 in comprising the frame 24 instead of the frame 21. Further, the micromirror element X2 is manufactured by machining a material substrate, which is an SOI substrate, using the MEMS technology described above in relation to the micromirror element X1. The material substrate has a laminated structure comprising a first silicon layer, a second silicon layer, and an insulation layer between the silicon layers, each silicon layer being provided with a predetermined conductivity by means of impurity doping. To facilitate understanding of the drawing, in FIG. 15 the regions originating from the first silicon layer which protrude toward the paper surface from the insulation layer are illustrated with diagonal shading. FIG. 16 shows the constitutions of the micromirror element X2 originating from the second silicon layer.

The frame 24 mainly originates from the first and second silicon layers, and takes a form which surrounds the oscillation section 10. As shown in FIG. 16, the region of the frame 24 originating from the second silicon layer is divided structurally into a first region 24a and a second region 24b. In this embodiment, the first region 24a and second region 24b are also separated electrically.

The torsional joining section 22 is constituted of a pair of torsion bars 22a formed on the first silicon layer. The torsion bars 22a are connected to the arm section 12 of the oscillation section 10 and the regions of frame 24 which originate from the first silicon layer, thereby linking these components. Further, as shown in FIG. 17, the torsion bars 22a are thinner than the arm section 12 and the region of the frame 24* originating from the first silicon layer in the element thickness direction H.

The comb-tooth electrode 23A is a region for generating electrostatic attraction in cooperation with the comb-tooth electrode 13A of the oscillation section 10, and is constituted of a plurality of electrode teeth 23a which extend respectively from the frame 24 at intervals in the extension direction of the arm section 12. The electrode teeth 23a originate mainly on the second silicon layer, and are fixed to the first region 24a of the frame 24 as shown in FIG. 16. The comb-tooth electrode 23A constitutes a driving mechanism together with the comb-tooth electrode 13A.

The comb-tooth electrode 23B is a site for generating electrostatic attraction in cooperation with the comb-tooth electrode 13B, and is constituted of a plurality of electrode teeth 23b extending from the frame 24. The electrode teeth 23b originate mainly on the second silicon layer, and are fixed to the second region 24b of the frame 24 as shown in FIG. 16. The second region 24b of the frame 24 is separated from the first region 24a both structurally and electrically, and therefore the comb-tooth electrode 23B and its electrode teeth 23b are separated electrically from the comb-tooth electrode 23A and its electrode teeth 23a, which are fixed to the first region 24a. The comb-tooth electrode 23B constitutes a driving mechanism together with the comb-tooth electrode 13B.

The constitution of the oscillation section 10, the remaining constitutions of the torsional joining section 22, and the remaining constitutions of the comb-tooth electrodes 23A, 23B in the micromirror element X2 are identical to those described above in relation to the oscillation section 10, torsional joining section 22, and comb-tooth electrodes 23A, 23B of the first embodiment.

In the micromirror element X2, the oscillation section 10 and mirror supporting portion 11 can be rotationally displaced about the oscillation axis A1 by applying a predetermined potential to the comb-tooth electrodes 13A, 13B, 23A, 23B as necessary. The application of a potential to the comb-tooth electrodes 13A, 13B can be realized via the region of the frame 24 originating from the first silicon layer, the two torsion bars 22a, and the arm section 12. The comb-tooth electrodes 13A, 13B are grounded, for example. Meanwhile, the application of a potential to the comb-tooth electrodes 23A, 23B can be realized via the first region 24a and second region 24b of the frame 24. The amount of rotary displacement occurring during the oscillating operation can be adjusted by regulating the potential that is applied to the comb-tooth electrodes 13A, 13B, 23A, 23B. By driving the oscillation section 10 and mirror supporting portion 11 to tilt in this manner, the reflection direction of the light that is reflected on the mirror surface 11a provided on the mirror supporting portion 11 can be switched arbitrarily.

In the micromirror element X2, the electrostatic attraction generated between the comb-tooth electrodes 13A and 23A and the electrostatic attraction generated between the comb-tooth electrodes 13B and 23B can be caused to differ by making the potential that is applied to the comb-tooth electrode 23A and the potential that is applied to the comb-tooth electrode 23B different. As a result, the amount of rotary displacement of the oscillation section 10 and mirror supporting portion 11 other than their rotary displacement about the rotary axis A1 can be controlled. For example, the amount of rotary displacement of the oscillation section 10 and mirror supporting portion 11 about an axis (an axis A1 shown in FIG. 18, for example) which intersects the rotary axis A1 can be regulated. Thus with the micromirror element X2, the attitude of the oscillation section 10 and mirror supporting portion 11 can be controlled such that the mirror surface 11a is always parallel to the rotary axis A1. This attitude regulating mechanism is favorable for realizing a high-precision light reflecting function.

Further, in the micromirror element X2, the number of electrode teeth 13a and 23a constituting the set of comb-tooth electrodes 13A and 23A and the number of electrode teeth 13b and 23b constituting the set of comb-tooth electrodes 13B and 23B are not restricted by the length of the mirror supporting portion 11 in the extension direction of the oscillation axis A1, which is orthogonal to the extension direction of the arm section 12. Hence with the micromirror element X2, a sufficient surface area to allow the electrode teeth 13a and 23a to face each other and a sufficient surface area to allow the electrode teeth 13b and 23b to face each other can be secured by providing a desired number of the electrode teeth 13a, 13b, 23a, and 23b, regardless of the design dimension of the mirror supporting portion 11 in the oscillation axis A1 direction. In this manner, similarly to the micromirror element X1 described above, the micromirror element X2 is suitable for achieving miniaturization by reducing the design dimension of the mirror supporting portion 11, and accordingly the entire element, in the oscillation axis A1 direction while maintaining enough driving force to drive the oscillating operation of the oscillation section 10 by providing a desired number of the electrode teeth 13a, 13b, 23a, and 23b, regardless of the design dimension of the mirror supporting portion 11 in the oscillation axis A1 direction.

Figure 19:
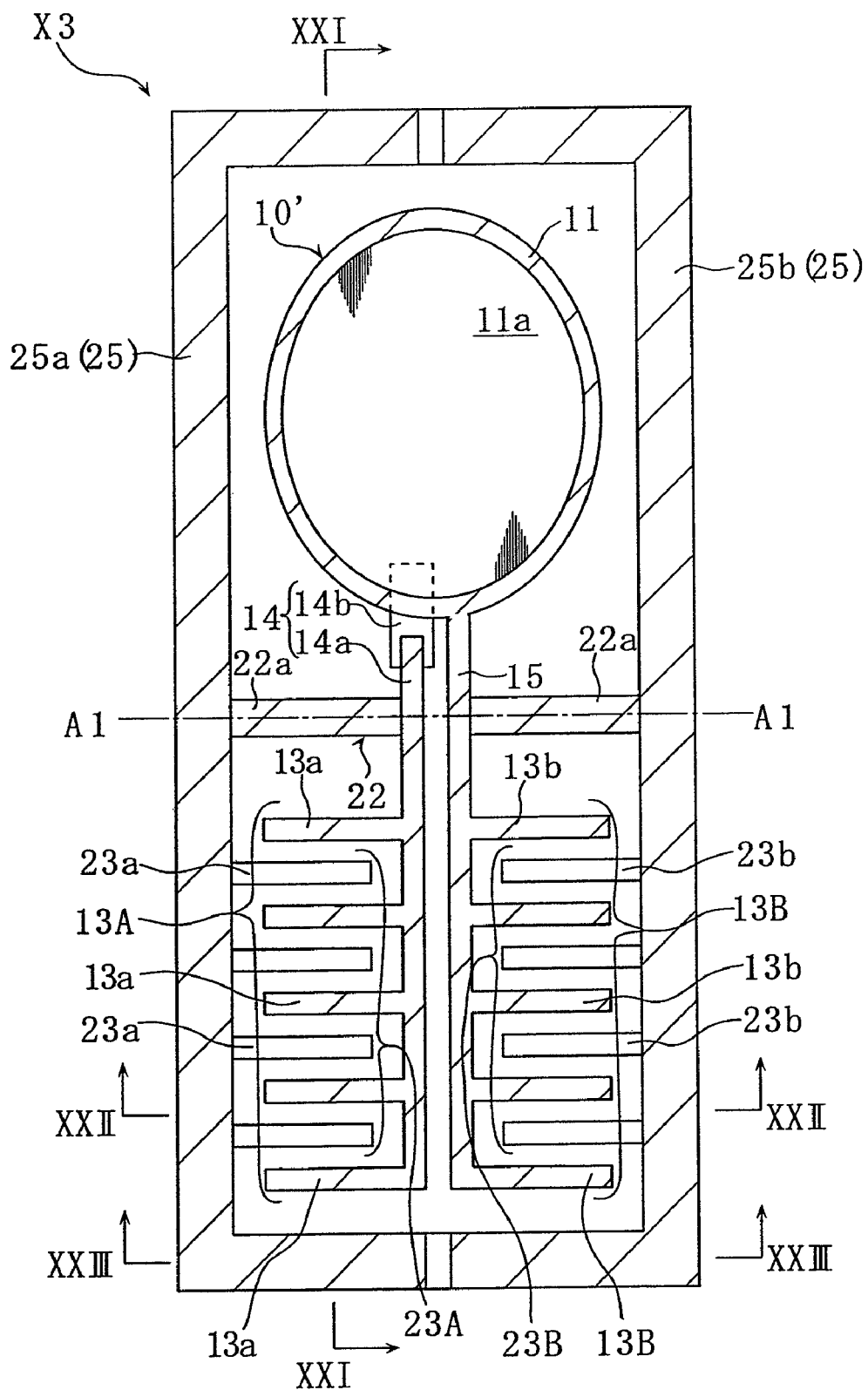
FIG. 19 is a plan view of a micromirror element according to a third embodiment of the present invention.
Figure 20:
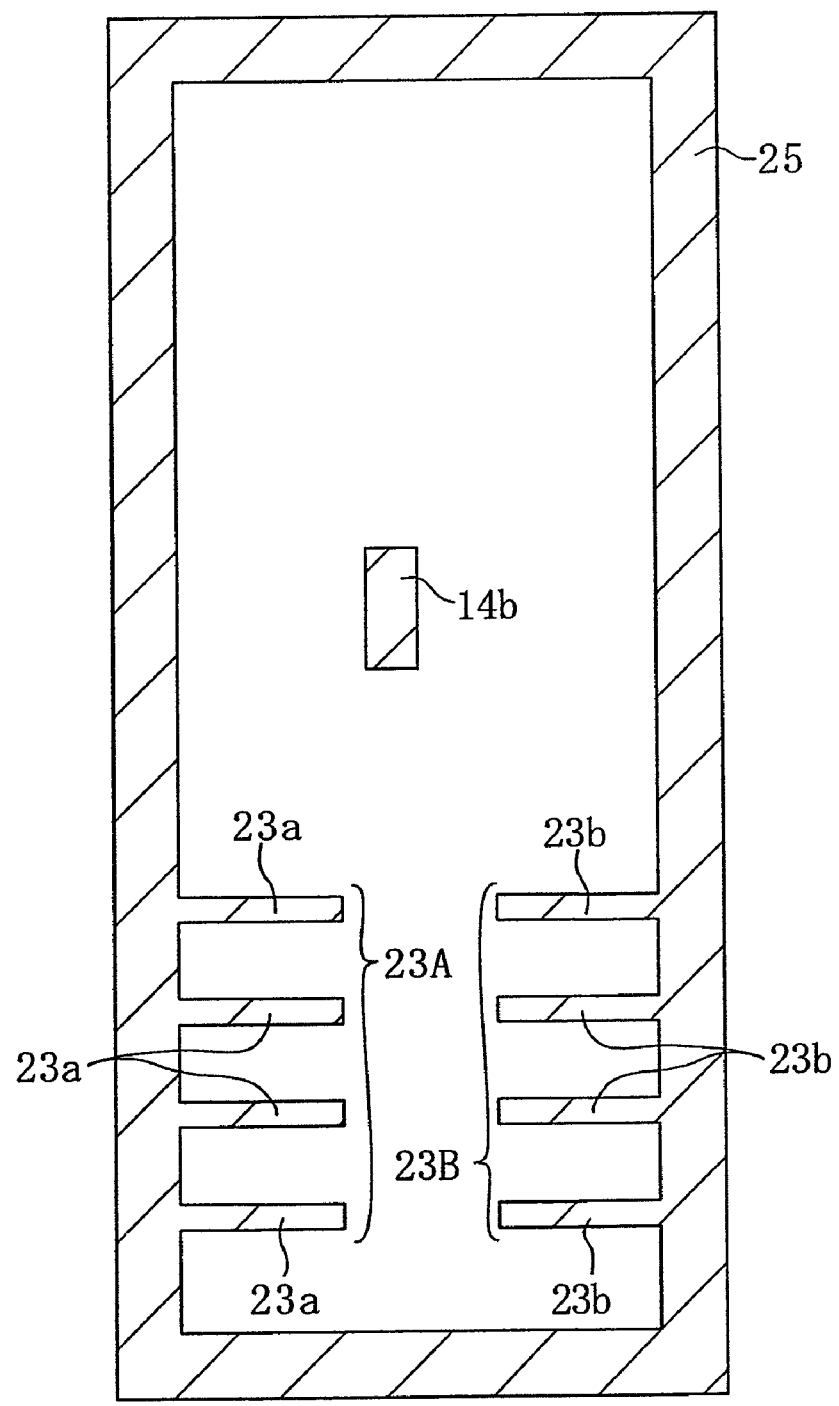
FIG. 20 is a partial plan view of the micromirror element shown in FIG. 19.
Figure 21:
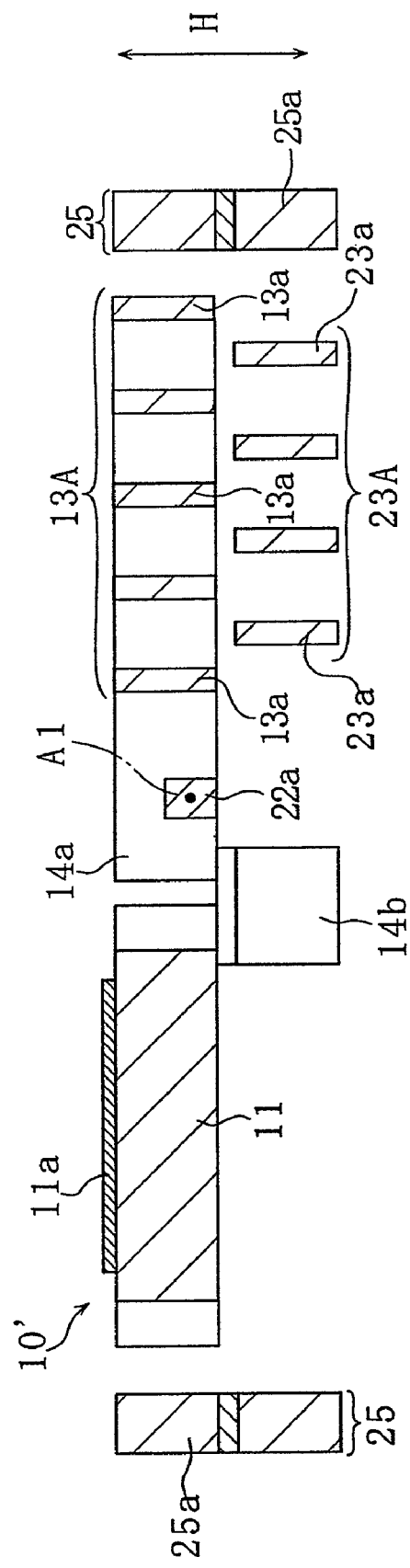
FIG. 21 is a sectional view along a line XXI-XXI in FIG. 19.
Figure 22:
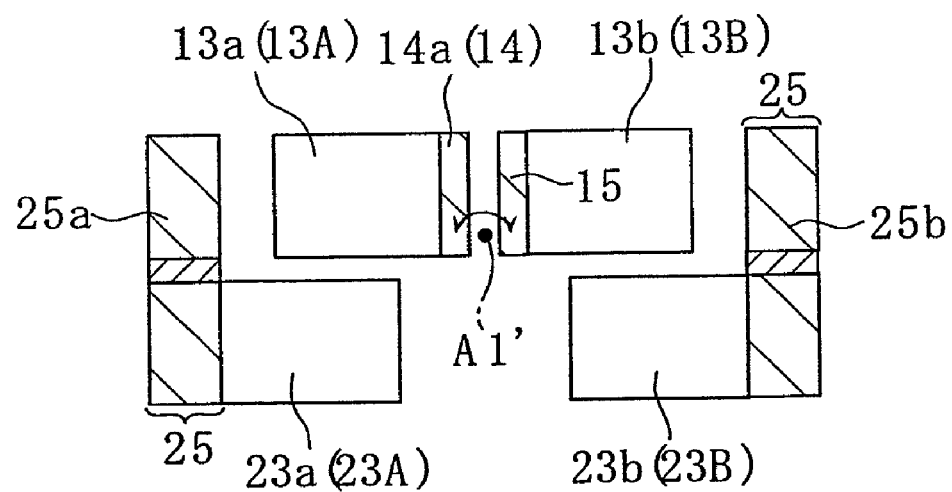
FIG. 22 is a sectional view along a line XXII-XXII in FIG. 19.
Figure 23:
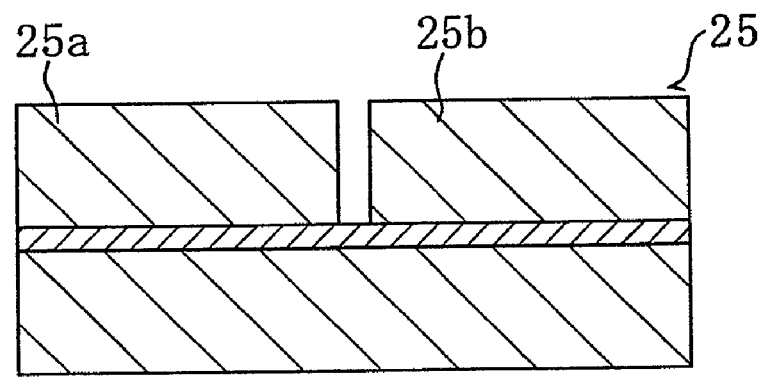
FIG. 23 is a sectional view along a line XXIII-XXIII in FIG. 19.

FIGS. 19 to 23 show a micromirror element X3 according to a third embodiment of the present invention. FIG. 19 is a plan view of the micromirror element X3, FIG. 20 is a partial plan view of the micromirror element X3, and FIGS. 21 to 23 are sectional views along a line XXI-XXI, a line XXII-XXII, and a line XXIII-XXIII in FIG. 19, respectively.

The micromirror element X3 comprises an oscillation section 10', a frame 25, a torsional joining section 22, and comb-tooth electrodes 23A, 23B. The micromirror element X3 differs from the micromirror element X1 in comprising the oscillation section 10' in place of the oscillation section 10, and in comprising the frame 25 in place of the frame 21. Further, the micromirror element X3 is manufactured by machining a material substrate, which is an SOI substrate, using the MEMS technology described above in relation to the micromirror element X1. The material substrate has a laminated structure comprising a first silicon layer, a second silicon layer, and an insulation layer between the silicon layers, each silicon layer being provided with a predetermined conductivity by means of impurity doping. To facilitate understanding of the drawing, in FIG. 19 the regions originating from the first silicon layer which protrude toward the paper surface from the insulation layer are illustrated with diagonal shading. FIG. 20 shows the constitutions of the micromirror element X3 which originate from the second silicon layer.

The oscillation section 10' comprises a mirror supporting portion 11, arm sections 14, 15, and comb-tooth electrodes 13A, 13B, and therefore differs from the oscillation section 10 in comprising the arm sections 14, 15 in place of the arm section 12.

The arm section 14 comprises a main portion 14a formed mainly on the first silicon layer, and a base portion 14b formed mainly on the second silicon layer, and extends from the mirror supporting portion 11. The main portion 14a of the arm section 14 is connected to the mirror supporting portion 11 via the base portion 14b.

The arm section 15 originates mainly on the first silicon layer, and extends from the mirror supporting portion 11 in the same direction as the arm section 14. Further, the arm section 15 is separated structurally from the arm section 14. In this embodiment, the arm section 15 is also separated electrically from the main portion 14a of the arm section 14. The distance by which the arm section 15 is separated from the arm section 14 is between 15 and 50 µm, for example.

The comb-tooth electrode 13A is constituted of a plurality of electrode teeth 13a. The plurality of electrode teeth 13a extend individually from the main portion 14a of the arm section 14 at intervals from each other in the extension direction of the arm section 14. The comb-tooth electrode 13B is constituted of a plurality of electrode teeth 13b. The plurality of electrode teeth 13b extend from the arm section 15 on the opposite side to the electrode teeth 13a at intervals from each other in the extension direction of the arm section 15. The electrode teeth 13a, 13b originate mainly on the first silicon layer. In this embodiment, as shown in FIG. 19, the extension direction of the electrode teeth 13a is orthogonal to the extension direction of the arm section 14, and the extension direction of the electrode teeth 13b is orthogonal to the extension direction of the arm section 15. Since the main portion 14a of the arm section 14 is separated electrically from the arm section 15, the comb-tooth electrode 13A and its electrode teeth 13a, which are fixed to the main portion 14a, are separated electrically from the comb-tooth electrode 13B and its electrode teeth 13b, which are fixed to the arm section 15.

The constitution of the mirror supporting portion in the oscillation section 10' and the remaining constitutions of the comb-tooth electrodes 13A, 13B are identical to those described above in relation to the mirror supporting portion 11 and comb-tooth electrodes 13A, 13B of the first embodiment.

The frame 25 originates mainly on the first and second silicon layers, and takes a form surrounding the oscillation section 10'. As shown in FIGS. 19 and 23, the region of the frame 25 originating from the first silicon layer is separated structurally into a first region 25a and a second region 25b. In this embodiment, the first region 25a and second region 25b are also separated electrically.

The torsional joining section 22 is constituted of a pair of torsion bars 22a formed on the first silicon layer. One of the torsion bars 22a is connected to the main portion 14a of the arm section 14 of the oscillation section 10' and the first region 25a of the frame 25, thereby linking these components. By means of this torsion bar 22a, the first region 25a and main portion 14a are electrically connected. Further, as shown in FIG. 21, this torsion bar 22a is thinner than the main portion 14a and the first region 25a in the element thickness direction H. The other torsion bar 22a is connected to the arm section 15 of the oscillation section 10' and the second region 25b of the frame 25, thereby linking these components. By means of this torsion bar 22a, the second region 25b and the arm section 15 are electrically connected. Further, this torsion bar 22a is thinner than the arm section 15 and the second region 25b in the element thickness direction H.

The comb-tooth electrode 23A is a region for generating electrostatic attraction in cooperation with the comb-tooth electrode 13A of the oscillation section 10', and is constituted of a plurality of electrode teeth 23a. The plurality of electrode teeth 23a extend respectively from the frame 25 at intervals from each other in the extension direction of the arm section 14. The electrode teeth 23a originate mainly on the second silicon layer, and are fixed to the region of the frame 25 originating from the second silicon layer, as shown in FIG. 20. The comb-tooth electrode 23A constitutes a driving mechanism together with the comb-tooth electrode 13A.

The comb-tooth electrode 23B is a site for generating electrostatic attraction in cooperation with the comb-tooth electrode 13B, and is constituted of a plurality of electrode teeth 23b. The plurality of electrode teeth 23b extend respectively from the frame 25 at intervals from each other in the extension direction of the arm section 15. The electrode teeth 23b originate mainly on the second silicon layer, and are fixed to the region of the frame 25 originating from the second silicon layer, as shown in FIG. 20. The comb-tooth electrode 23B is connected electrically to the comb-tooth electrode 23A via the region of the frame 25 originating from the second silicon layer. The comb-tooth electrode 23B constitutes a driving mechanism together with the comb-tooth electrode 13B.

The remaining constitutions of the torsional joining section 22 and the remaining constitutions of the comb-tooth electrodes 23A, 23B in the micromirror element X3 are identical to those described above in relation to the torsional joining section 22 and comb-tooth electrodes 23A, 23B of the first embodiment.

In the micromirror element X3, the oscillation section 10' and mirror supporting portion 11 can be rotationally displaced about the oscillation axis A1 by applying a predetermined potential to the comb-tooth electrodes 13A, 13B, 23A, 23B as necessary. The application of a potential to the comb-tooth electrode 13A can be realized via the first region 25a of the frame 25, one of the torsion bars 22a, and the main portion 14a of the arm section 14. The application of a potential to the comb-tooth electrode 13B can be realized via the second region 25b of the frame 25, the other torsion bar 22a, and the arm section 15. The application of a potential to the comb-tooth electrodes 23A, 23B can be realized via the region of the frame 25 originating from the second silicon layer. The comb-tooth electrodes 23A, 23B are grounded, for example. The region of the frame 25 originating from the second silicon layer and the region of the frame 25 originating from the first silicon layer (the first region 25a and second region 25b) are separated electrically by the insulation layer. The amount of rotary displacement occurring during the oscillating operation can be adjusted by regulating the potential that is applied to the comb-tooth electrodes 13A, 13B, 23A, 23B. By driving the oscillation section 10' and mirror supporting portion 11 to tilt this manner, the reflection direction of the light that is reflected on the mirror surface 11a provided on the mirror supporting portion 11 can be switched arbitrarily.

In the micromirror element X3, the electrostatic attraction generated between the comb-tooth electrodes 13A and 23A and the electrostatic attraction generated between the comb-tooth electrodes 13B and 23B can be caused to differ by making the potential that is applied to the comb-tooth electrode 13A and the potential that is applied to the comb-tooth electrode 13B different. As a result, the amount of rotary displacement of the oscillation section 10' and mirror supporting portion 11 other than their rotary displacement about the rotary axis A1 can be controlled. For example, the amount of rotary displacement of the oscillation section 10' and mirror supporting portion 11 about an axis (an axis A1' shown in FIG. 22, for example) which intersects the rotary axis A1 can be regulated. Thus with the micromirror element X3, the attitude of the oscillation section 10' and mirror supporting portion 11 can be controlled such that the mirror surface 11a is always parallel to the rotary axis A1. This attitude regulating mechanism is favorable for realizing a high-precision light reflecting function.

Moreover, similarly to the micromirror element X1 described above, the micromirror element X3 is suitable for achieving miniaturization by reducing the design dimension of the mirror supporting portion 11, and accordingly the entire element, in the oscillation axis A1 direction while maintaining enough driving force to drive the oscillating operation of the oscillation section 10' by providing a desired number of the electrode teeth 13a, 13b, 23a, and 23b, regardless of the design dimension of the mirror supporting portion 11 in the oscillation axis A1 direction.

Figure 24:
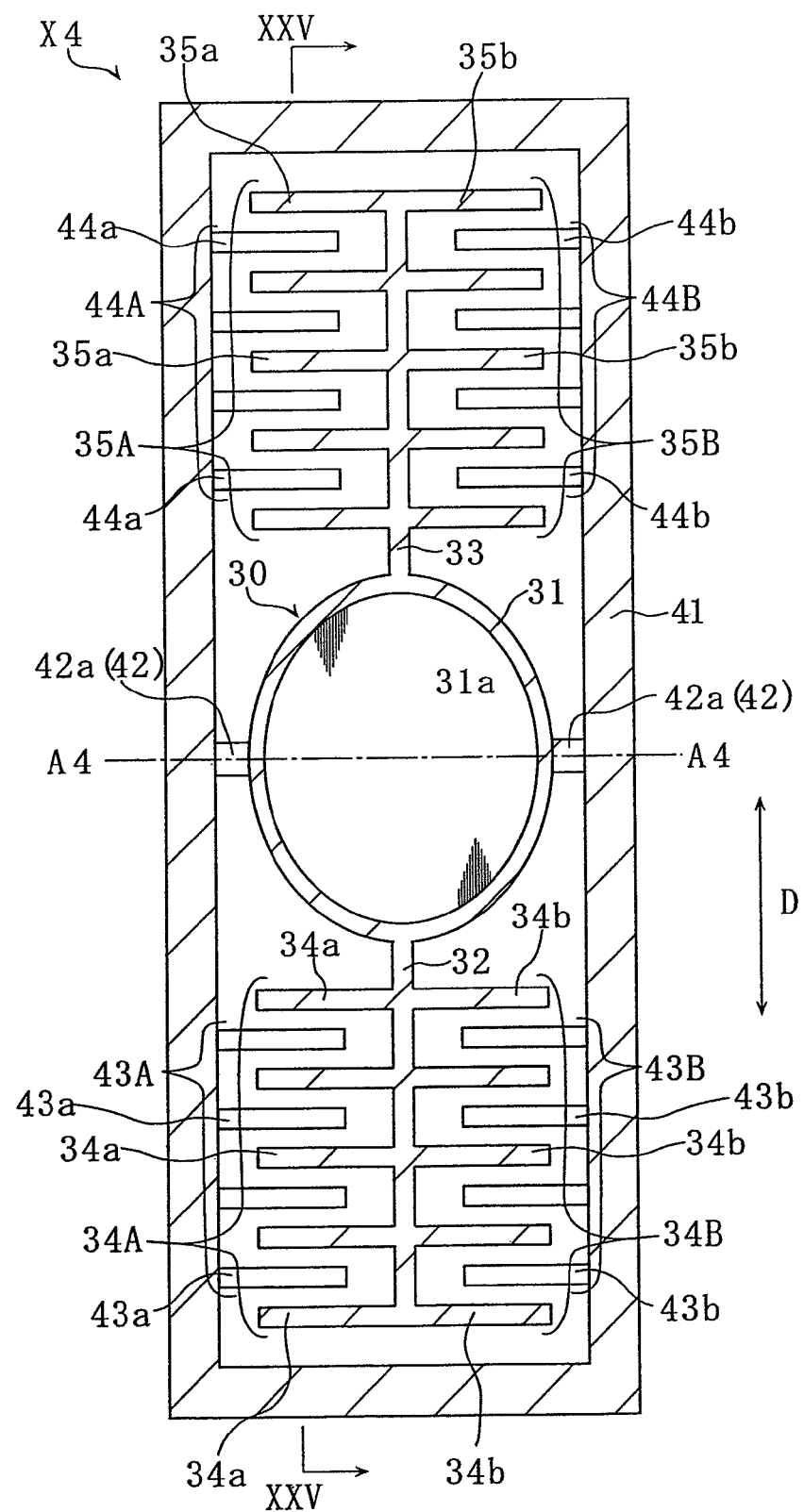
FIG. 24 is a plan view of a micromirror element according to a fourth embodiment of the present invention.
Figure 25:
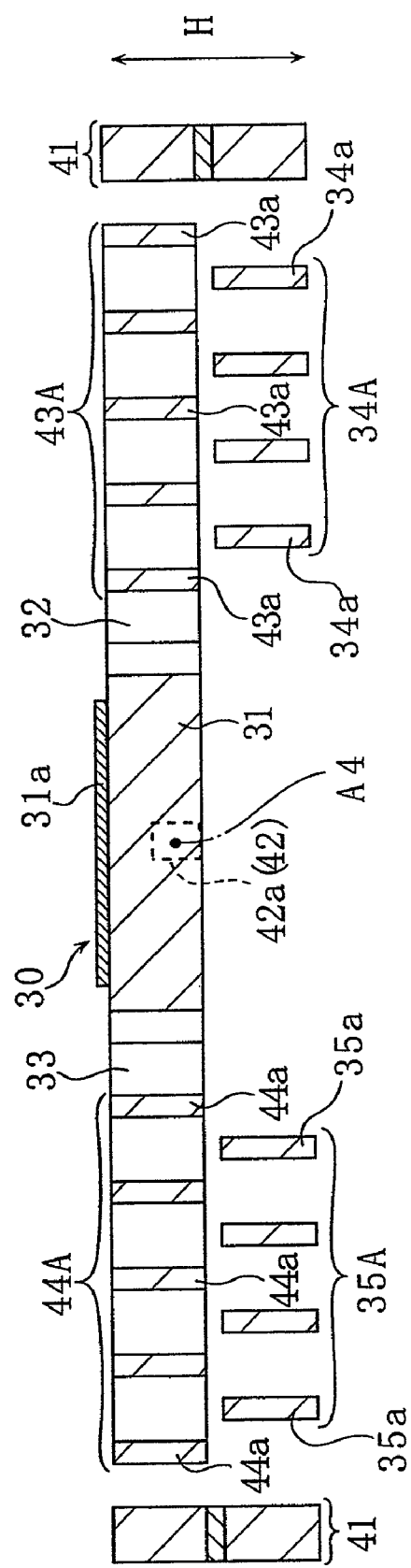
FIG. 25 is a sectional view along a line XXV-XXV in FIG. 24.

FIGS. 24 and 25 show a micromirror element X4 according to a fourth embodiment of the present invention. FIG. 24 is a plan view of the micromirror element X4, and FIG. 25 is a sectional view along a line XXV-XXV in FIG. 24.

The micromirror element X4 comprises an oscillation section 30, a frame 41, a torsional joining section 42, and comb-tooth electrodes 43A, 43B, 44A, 44B. Further, the micromirror element X4 is manufactured by machining a material substrate, which is an SOI substrate, using the MEMS technology described above in relation to the micromirror element X1. The material substrate has a laminated structure comprising a first silicon layer, a second silicon layer, and an insulation layer between the silicon layers, each silicon layer being provided with a predetermined conductivity by means of impurity doping. To facilitate understanding of the drawing, in FIG. 24 the regions originating from the first silicon layer which protrude toward the paper surface from the insulation layer are illustrated with diagonal shading.

The oscillation section 30 comprises a mirror supporting portion 31, arm sections 32, 33, and comb-tooth electrodes 34A, 34B, 35A, 35B.

The mirror supporting portion 31 originates mainly on the first silicon layer, and is provided on its surface with a mirror surface 31a having a light reflecting function. The mirror supporting portion 31 and mirror surface 31a constitute the movable functional section of the present invention.

The arm section 32 originates mainly on the first silicon layer, and extends from the mirror supporting portion 31. The arm section 33 originates mainly on the first silicon layer, and extends from the mirror supporting portion 31 on the opposite side to the arm section 32. The extension direction of the arm section 32 matches the extension direction of the arm section 33.

The comb-tooth electrode 34A is constituted of a plurality of electrode teeth 34a. The plurality of electrode teeth 34a extend respectively from the arm section 32 at intervals from each other in the extension direction of the arm section 32. The comb-tooth electrode 34B is constituted of a plurality of electrode teeth 34b. The plurality of electrode teeth 34b extend respectively from the arm section 32 on the opposite side to the electrode teeth 34a, at intervals from each other in the extension direction of the arm section 32. The electrode teeth 34a, 34b originate mainly on the first silicon layer. In this embodiment, as shown in FIG. 24, the extension direction of the electrode teeth 34a, 34b is orthogonal to the extension direction of the arm section 32. The comb-tooth electrode 34A and its electrode teeth 34a are connected electrically to the comb-tooth electrode 34B and its electrode teeth 34b via the arm section 32.

The comb-tooth electrode 35A is constituted of a plurality of electrode teeth 35a. The plurality of electrode teeth 35a extend respectively from the arm section 33 at intervals from each other in the extension direction of the arm section 33. The comb-tooth electrode 35B is constituted of a plurality of electrode teeth 35b. The plurality of electrode teeth 35b extend respectively from the arm section 33 on the opposite side to the electrode teeth 35a, at intervals from each other in the extension direction of the arm section 33. The electrode teeth 35a, 35b originate mainly on the first silicon layer. In this embodiment, as shown in FIG. 24, the extension direction of the electrode teeth 35a, 35b is orthogonal to the extension direction of the arm section 33. The comb-tooth electrode 35A and its electrode teeth 35a are connected electrically to the comb-tooth electrode 35B and its electrode teeth 35b via the arm section 33. The comb-tooth electrodes 35A, 35B are also connected electrically to the comb-tooth electrodes 34A, 34B via the mirror supporting portion 31.

The frame 41 originates mainly on the first and second silicon layers, and takes a form which surrounds the oscillation section 30. Further, the frame 41 has a predetermined mechanical strength so as to support the structure within the frame 41.

The torsional joining section 42 is constituted of a pair of torsion bars 42a. The torsion bars 42a originate mainly on the first silicon layer, and are connected to the mirror supporting portion 31 of the oscillation section 30 and the region of the frame 41 which originates from the first silicon layer, thereby linking these components. The region of the frame 41 originating from the first silicon layer and the mirror supporting portion 31 are electrically connected by the torsion bars 42a. Further, as shown in FIG. 25, the torsion bars 42a are thinner than the mirror supporting portion 31 and the region of the frame 41 originating from the first silicon layer in the element thickness direction H. The torsional joining section 42 constituted of the pair of torsion bars 42a defines an oscillation axis A4 for the oscillating operation of the oscillation section 30 and mirror supporting portion 31. The oscillation axis A4 is orthogonal to a direction D shown by the arrow in FIG. 24, or in other words the extension direction of the arm sections 32, 33. Accordingly, the extension direction of the electrode teeth 34a, 34b described above, which extend from the arm section 32 in an orthogonal direction to the extension direction of the arm section 32, is parallel to the oscillation axis A4, and the extension direction of the electrode teeth 35a, 35b described above, which extend from the arm section 33 in an orthogonal direction to the extension direction of the arm section 33, is parallel to the oscillation axis A4. The oscillation axis A4 preferably passes through or close to the center of gravity of the oscillation section 30.

The comb-tooth electrode 43A is a region for generating electrostatic attraction in cooperation with the comb-tooth electrode 34A, and is constituted of a plurality of electrode teeth 43a. The plurality of electrode teeth 43a extend respectively from the frame 41 at intervals in the extension direction of the arm section 32. The electrode teeth 43a originate mainly on the second silicon layer, and are fixed to the region of the frame 41 originating from the second silicon layer. In this embodiment, as shown in FIG. 24, the extension direction of the electrode teeth 43a is orthogonal to the extension direction of the arm section 32, and the extension direction of the electrode teeth 43a is parallel to the oscillation axis A4.

The comb-tooth electrode 43A constitutes a driving mechanism together with the comb-tooth electrode 34A. As shown in FIG. 25, the comb-tooth electrodes 34A, 43A are positioned at different heights to each other when the oscillation section 30 is inoperative, for example. Furthermore, the electrode teeth 34a, 43a are offset from each other so that the comb-tooth electrodes 34A, 43A do not come into contact with each other during the oscillating operation of the oscillation section 30.

The comb-tooth electrode 43B is a region for generating electrostatic attraction in cooperation with the comb-tooth electrode 34B, and is constituted of a plurality of electrode teeth 43b. The plurality of electrode teeth 43b extend respectively from the frame 41 at intervals in the extension direction of the arm section 32. The electrode teeth 43b originate mainly on the second silicon layer, and are fixed to the region of the frame 41 originating from the second silicon layer. The comb-tooth electrode 43B and its electrode teeth 43b are connected electrically to the comb-tooth electrode 43A and its electrode teeth 43a via a part of the region of the frame 41 originating from the second silicon layer. In this embodiment, as shown in FIG. 24, the extension direction of the electrode teeth 43b is orthogonal to the extension direction of the arm section 32, and the extension direction of the electrode teeth 43b is parallel to the oscillation axis A4.

The comb-tooth electrode 43B constitutes a driving mechanism together with the comb-tooth electrode 34B. The comb-tooth electrodes 34B, 43B are positioned at different heights to each other when the oscillation section 30 is inoperative, for example. Furthermore, the electrode teeth 34b, 43b are offset from each other so that the comb-tooth electrodes 34B, 43B do not come into contact with each other during the oscillating operation of the oscillation section 30.

The comb-tooth electrode 44A is a region for generating electrostatic attraction in cooperation with the comb-tooth electrode 35A, and is constituted of a plurality of electrode teeth 44a. The plurality of electrode teeth 44a extend respectively from the frame 41 at intervals in the extension direction of the arm section 33. The electrode teeth 44a originate mainly on the second silicon layer, and are fixed to the region of the frame 41 originating from the second silicon layer. In this embodiment, the fixing locations of the electrode teeth 44a in the region of the frame 41 originating from the second silicon layer are separated electrically from the fixing locations of the aforementioned electrode teeth 43a, 43b in the region of the frame 41 originating from the second silicon layer. Accordingly, the comb-tooth electrode 44A and its electrode teeth 44a are separated electrically from the comb-tooth electrodes 43A, 43B and their electrode teeth 43a, 43b. Also in this embodiment, as shown in FIG. 24, the extension direction of the electrode teeth 44a is orthogonal to the extension direction of the arm section 33, and the extension direction of the electrode teeth 44a is parallel to the oscillation axis A4.

This comb-tooth electrode 44A constitutes a driving mechanism together with the comb-tooth electrode 35A. As shown in FIG. 25, the comb-tooth electrodes 35A, 44A are positioned at different heights to each other when the oscillation section 30 is inoperative, for example. Furthermore, the electrode teeth 35a, 44a are offset from each other so that the comb-tooth electrodes 35A, 44A do not come into contact with each other during the oscillating operation of the oscillation section 30.

The comb-tooth electrode 44B is a region for generating electrostatic attraction in cooperation with the comb-tooth electrode 35B, and is constituted of a plurality of electrode teeth 44b. The plurality of electrode teeth 44b extend respectively from the frame 41 at intervals in the extension direction of the arm section 33. The electrode teeth 44b originate mainly on the second silicon layer, and are fixed to a part of the region of the frame 41 originating from the second silicon layer. In this embodiment, the fixing locations of the electrode teeth 44b in the region of the frame 41 originating from the second silicon layer are separated electrically from the fixing locations of the aforementioned electrode teeth 43a, 43b in the region of the frame 41 originating from the second silicon layer. Accordingly, the comb-tooth electrode 44B and its electrode teeth 44b are separated electrically from the comb-tooth electrodes 43A, 43B and their electrode teeth 43a, 43b. On the other hand, the comb-tooth electrode 44B and its electrode teeth 44b are connected electrically to the comb-tooth electrode 44A and its electrode teeth 44a via a part of the region of the frame 41 originating from the second silicon layer. Also in this embodiment, as shown in FIG. 24, the extension direction of the electrode teeth 44b is orthogonal to the extension direction of the arm section 33, and the extension direction of the electrode teeth 44b is parallel to the oscillation axis A4.

This comb-tooth electrode 44B constitutes a driving mechanism together with the comb-tooth electrode 35B. The comb-tooth electrodes 35B, 44B are positioned at different heights to each other when the oscillation section 30 is inoperative, for example. Furthermore, the electrode teeth 35b, 44b are offset from each other so that the comb-tooth electrodes 35B, 44B do not come into contact with each other during the oscillating operation of the oscillation section 30.

In the micromirror element X4, the oscillation section 30 and mirror supporting portion 31 can be rotationally displaced about the oscillation axis A4 by applying a predetermined potential to the comb-tooth electrodes 34A, 34B, 35A, 35B, 43A, 43B, 44A, and 44B as necessary. The application of a potential to the comb-tooth electrodes 34A, 34B, 35A, and 35B can be realized via the region of the frame 41 originating from the first silicon layer, the two torsion bars 42a, the mirror supporting portion 31, and the arm sections 32 and 33. The comb-tooth electrodes 34A, 34B, 35A, 35B are grounded, for example. Meanwhile, the application of a potential to the comb-tooth electrodes 43A and 43B can be realized via a part of the region of the frame 41 originating from the second silicon layer. The application of a potential to the comb-tooth electrodes 44A and 44B can be realized via another part of the region of the frame 41 originating from the second silicon layer. The amount of rotary displacement occurring during the oscillating operation can be adjusted by regulating the potential that is applied to the comb-tooth electrodes 34A, 34B, 35A, 35B, 43A, 43B, 44A, and 44B. By driving the oscillation section 30 and mirror supporting portion 31 to tilt in this manner, the reflection direction of the light that is reflected on the mirror surface 31a provided on the mirror supporting portion 31 can be switched arbitrarily.

Moreover, similarly to the micromirror element X1 described above, the micromirror element X4 is suitable for achieving miniaturization by reducing the design dimension of the mirror supporting portion 31, and accordingly the entire element, in the oscillation axis A4 direction while maintaining enough driving force to drive the oscillating operation of the oscillation section 30 by providing a desired number of the electrode teeth 34a, 34b, 35a, 35b, 43a, 43b, 44a, and 44b, regardless of the design dimension of the mirror supporting portion 31 in the oscillation axis A4 direction.

Figure 26:
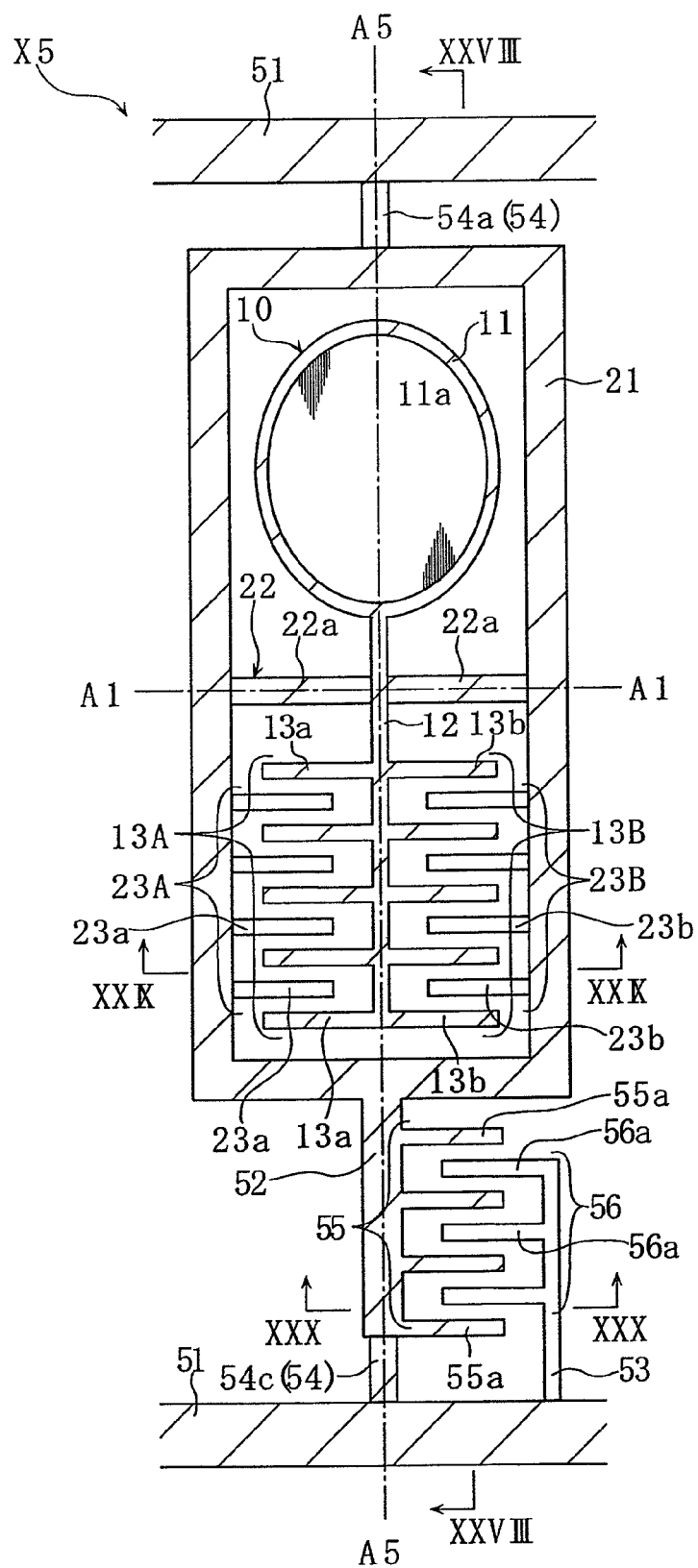
FIG. 26 is a plan view of a micromirror element according to a fifth embodiment of the present invention.
Figure 27:
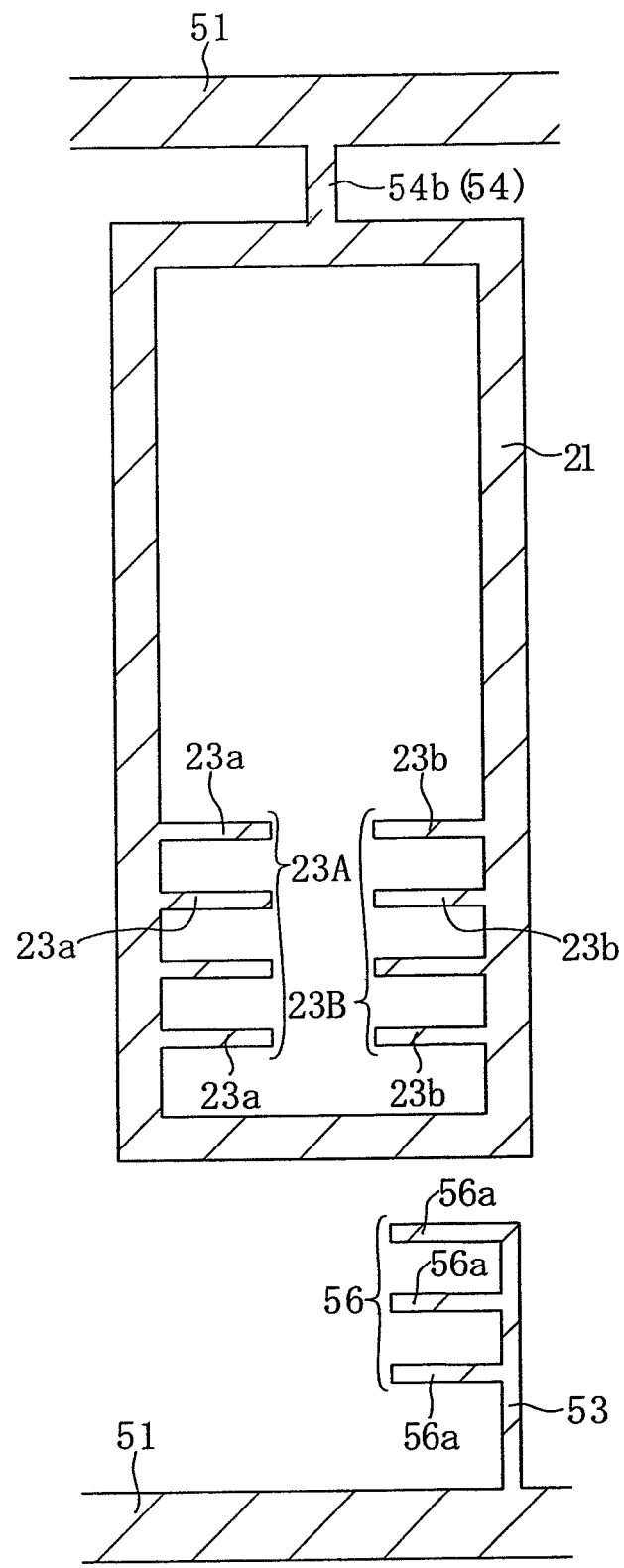
FIG. 27 is a partial plan view of the micromirror element shown in FIG. 26.
Figure 28:
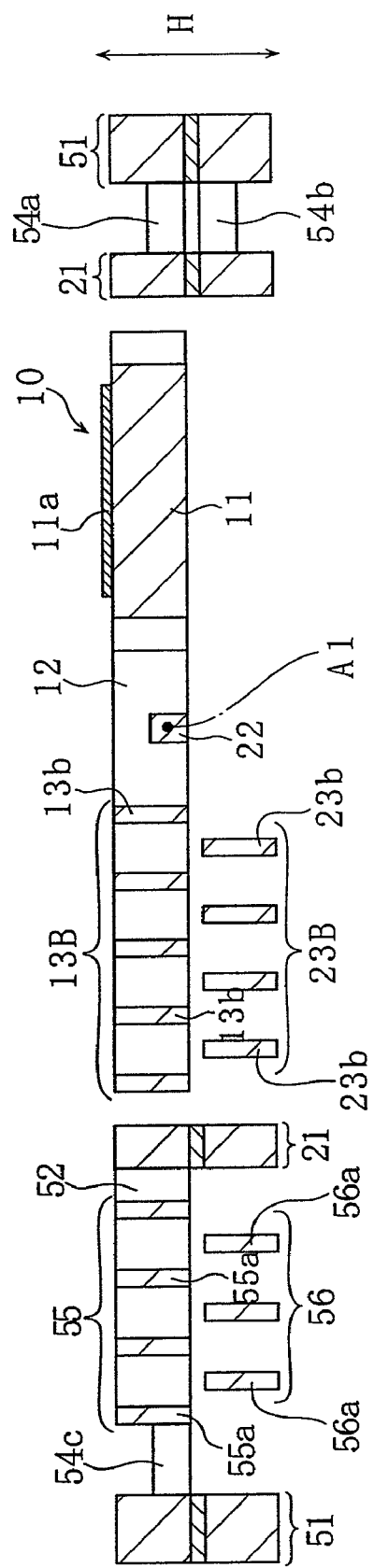
FIG. 28 is a sectional view along a line XXVIII-XXVIII in FIG. 26.
Figure 29:
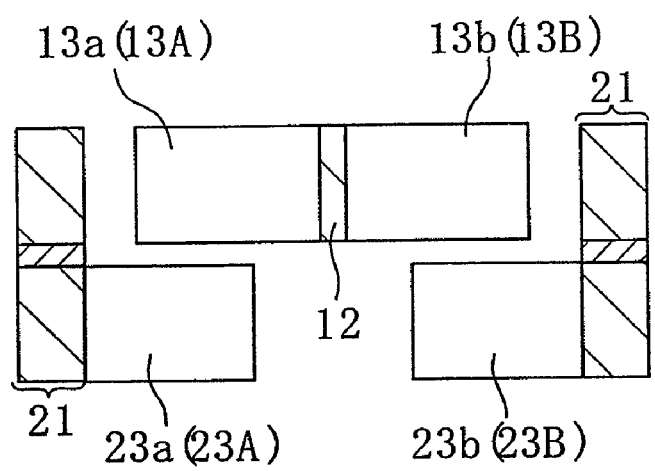
FIG. 29 is a sectional view along a line XXIX-XXIX in FIG. 26.
Figure 30:
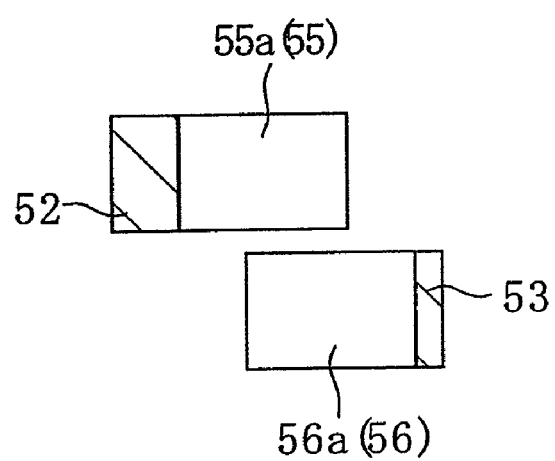
FIG. 30 is a sectional view along a line XXX-XXX in FIG. 26.

FIGS. 26 through 30 show a micromirror element X5 according to a fifth embodiment of the present invention. FIG. 26 is a plan view of the micromirror element X5, and FIG. 27 is a partial plan view of the micromirror element X5. FIGS. 28 to 30 are sectional views along a line XXVIII-XXVIII, a line XXIX-XXIX, and a line XXX-XXX in FIG. 26, respectively.

The micromirror element X5 comprises an oscillation section 10, a frame 21, a torsional joining section 22, comb-tooth electrodes 23A, 23B, a frame 51 (illustrated partially), arm sections 52, 53, a torsional joining section 54, and comb-tooth electrodes 55, 56. Further, the micromirror element X5 is manufactured by machining a material substrate, which is an SOI substrate, using the MEMS technology described above in relation to the micromirror element X1. The material substrate has a laminated structure comprising a first silicon layer, a second silicon layer, and an insulation layer between the silicon layers, each silicon layer being provided with a predetermined conductivity by means of impurity doping. To facilitate understanding of the drawing, in FIG. 26 the regions originating from the first silicon layer which protrude toward the paper surface from the insulation layer are illustrated with diagonal shading. FIG. 27 shows the constitutions of the micromirror element X5 originating from the second silicon layer.

The oscillation section 10, frame 21, torsional joining section 22, and comb-tooth electrodes 23A, 23B of the micromirror element X5 are similar to the oscillation section 10, frame 21, torsional joining section 22, and comb-tooth electrodes 23A, 23B described above in the first embodiment.

The frame 51 originates mainly on the first and second silicon layers, and has a predetermined mechanical strength in order to support the structure within the frame 51. The region of the frame 51 originating from the second silicon layer is shown in FIG. 27.

The arm section 52 originates mainly on the first silicon layer, and extends from the frame 21 in an orthogonal direction to the oscillation axis A1 of the oscillation section 10. Further, as shown in FIG. 28, the arm section 52 is fixed to the region of the frame 21 originating from the first silicon layer. The arm section 53 originates mainly on the second silicon layer, and extends from the frame 51 in an orthogonal direction to the oscillation axis A1 of the oscillation section 10 and parallel to the arm section 52. Further, as shown in FIG. 27, the arm section 53 is fixed to the region of the frame 51 originating from the second silicon layer.

The torsional joining section 54 is constituted of a set of torsion bars 59a, 54b and a torsion bar 54c.

The torsion bar 54a originates mainly on the first silicon layer, and is connected to the region of the frame 21 originating from the first silicon layer and the region of the frame 51 originating from the first silicon layer, thereby linking these components. The region of the frame 51 originating from the first silicon layer and the region of the frame 21 originating from the first silicon layer are connected electrically by the torsion bar 54a. Further, as shown in FIG. 28, the torsion bar 54a is thinner than the region of the frame 21 originating from the first silicon layer and the region of the frame 51 originating from the first silicon layer in the element thickness direction H.

The torsion bar 54b originates mainly on the second silicon layer, and is connected to the region of the frame 21 originating from the second silicon layer and the region of the frame 51 originating from the second silicon layer, thereby linking these components. The region of the frame 51 originating from the second silicon layer and the region of the frame 21 originating from the second silicon layer are connected electrically by the torsion bar 54b. In the region of the frame 51 originating from the second silicon layer, the fixing location of the torsion bar 54b is separated electrically from the fixing location of the aforementioned arm section 53. Further, as shown in FIG. 28, the torsion bar 54b is thinner than the region of the frame 21 originating from the second silicon layer and the region of the frame 51 originating from the second silicon layer in the element thickness direction H.

The torsion bar 54c originates mainly on the first silicon layer, and is connected to the region of the frame 51 originating from the first silicon layer and the arm section 52, thereby linking these components. The region of the frame 51 originating from the first silicon layer and the arm section 52 are connected electrically by the torsion bar 54c. Further, as shown in FIG. 28, the torsion bar 54c is thinner than the region of the frame 51 originating from the first silicon layer and the arm section 52 in the element thickness direction H.

The torsional joining section 54 (torsion bars 54a, 54b, 54c) defines an oscillation axis A5 of the oscillating operation of the frame 21. The extension direction of the oscillation axis A5 is orthogonal to the extension direction of the oscillation axis A1. The oscillation axis A5 preferably passes through or close to the center of gravity of the oscillation section 10.

The comb-tooth electrode 55 is constituted of a plurality of electrode teeth 55a. The plurality of electrode teeth 55a extend respectively from the arm section 52 at intervals from each other in the extension direction of the arm section 52. The electrode teeth 55a originate mainly on the first silicon layer.

The comb-tooth electrode 56 is a region for generating electrostatic attraction in cooperation with the comb-tooth electrode 55, and is constituted of a plurality of electrode teeth 56a. The plurality of electrode teeth 56a extend respectively from the arm section 53 at intervals from each other in the extension direction of the arm section 53. The electrode teeth 56a originate mainly on the second silicon layer.

The comb-tooth electrodes 55, 56 constitute the driving mechanism of the element. As shown in FIGS. 28 and 30, the comb-tooth electrodes 55, 56 are positioned at different heights to each other when the frame 21 is inoperative, for example. Furthermore, the electrode teeth 55a, 56a are offset from each other so that the comb-tooth electrodes 55, 56 do not come into contact with each other during the oscillating operation of the frame 21.

In the micromirror element X5, by applying a predetermined potential as needed to the comb-tooth electrodes 13A, 13B, 23A, 23B, 55, 56, the oscillation section 10 and mirror supporting portion 11 can be driven to tilt about the oscillation axis A1, and moreover, the frame 21, and accordingly the oscillation section 10, can be driven to tilt about the oscillation axis A5. In other words, the micromirror element X5 is a so-called biaxial oscillating element.

The application of a potential to the comb-tooth electrodes 13A, 13B can be realized via the region of the frame 51 originating from the first silicon layer, the torsion bar 54a, the region of the frame 21 originating from the first silicon layer, the two torsion bars 22a, and the arm section 12, or via the region of the frame 51 originating from the first silicon layer, the torsion bar 54c, the arm section 52, the region of the frame 21 originating from the first silicon layer, the two torsion bars 22a, and the arm section 12. The application of a potential to the comb-tooth electrode 55 can be realized via the region of the frame 51 originating from the first silicon layer, the torsion bars 54a, the region of the frame 21 originating from the first silicon layer, and the arm section 52, or via the region of the frame 51 originating from the first silicon layer, the torsion bar 54c, and the arm section 52. The comb-tooth electrodes 13A, 13B, 55 are grounded, for example. The application of a potential to the comb-tooth electrodes 23A, 23B can be realized via the region of the frame 51 originating from the second region, the torsion bar 54b, and the region of the frame 21 originating from the second silicon layer. The application of a potential to the comb-tooth electrode 56 can be realized via the region of the frame 51 originating from the second silicon layer and the arm section 53. The amount of rotary displacement about the oscillation axis A1 during the oscillating operation can be adjusted by regulating the potential that is applied to the comb-tooth electrodes 13A, 13B, 23A, and 23B. The amount of rotary displacement about the oscillation axis A5 during the oscillating operation can be adjusted by regulating the potential that is applied to the comb-tooth electrodes 55 and 56. By driving the oscillation section 10 and mirror supporting portion 11, and the frame 21 and accordingly the oscillation section 10, to tilt in this manner, the reflection direction of the light that is reflected on the mirror surface 11a provided on the mirror supporting portion 11 can be switched arbitrarily.

Further, similarly to the micromirror element X1 described above, the micromirror element X5 is suitable for achieving miniaturization by reducing the design dimension of the mirror supporting portion 11, and accordingly the entire element, in the oscillation axis A1 direction while maintaining enough driving force to drive the oscillating operation of the oscillation section 10 by providing a desired number of the electrode teeth 13a, 13b, 23a, 23b, 55a, 56a, regardless of the design dimension of the mirror supporting portion 11 in the oscillation axis A1 direction.

Figure 31:
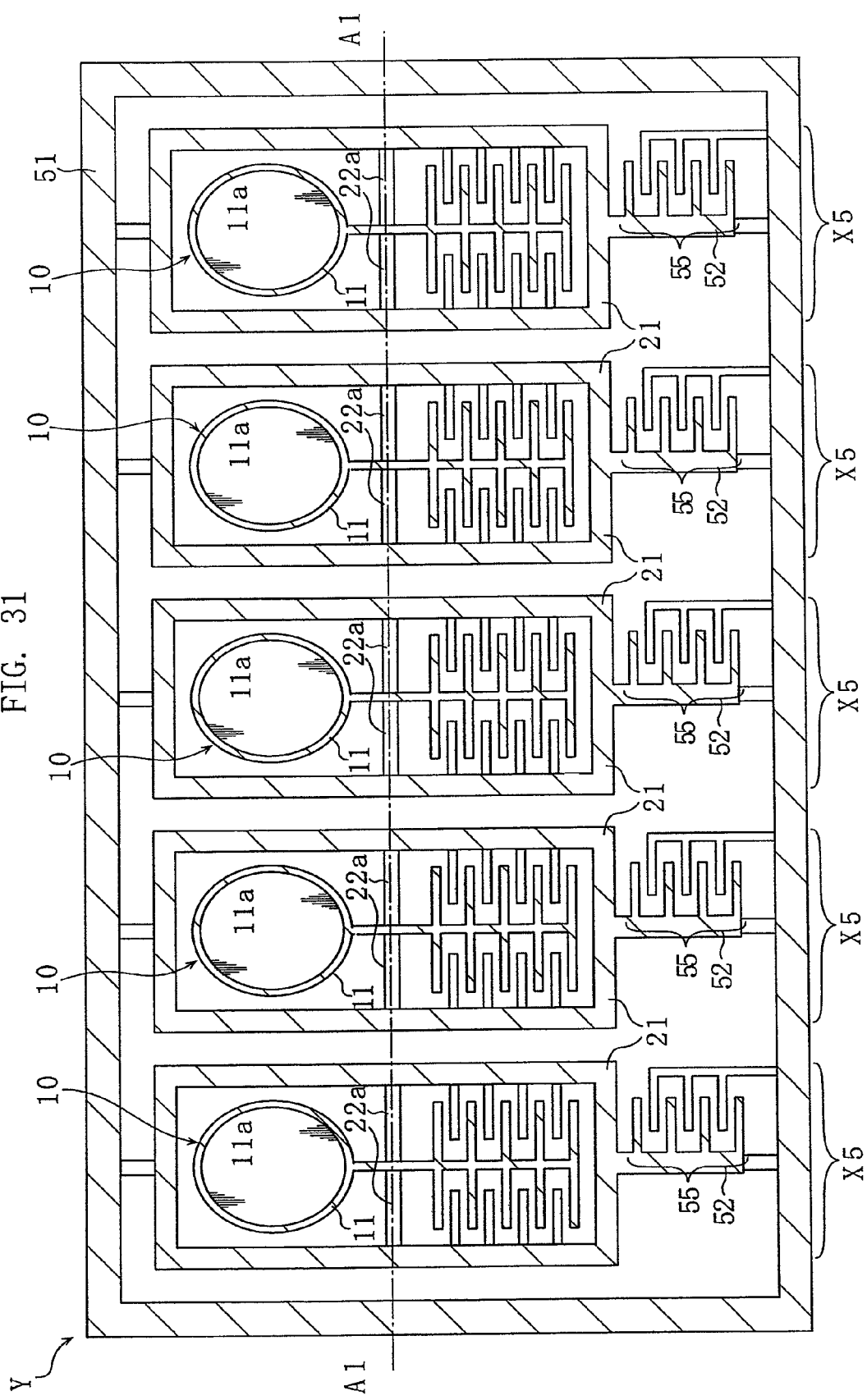
FIG. 31 shows a micromirror array comprising a plurality of the micromirror elements shown in FIG. 26.
Figure 32:
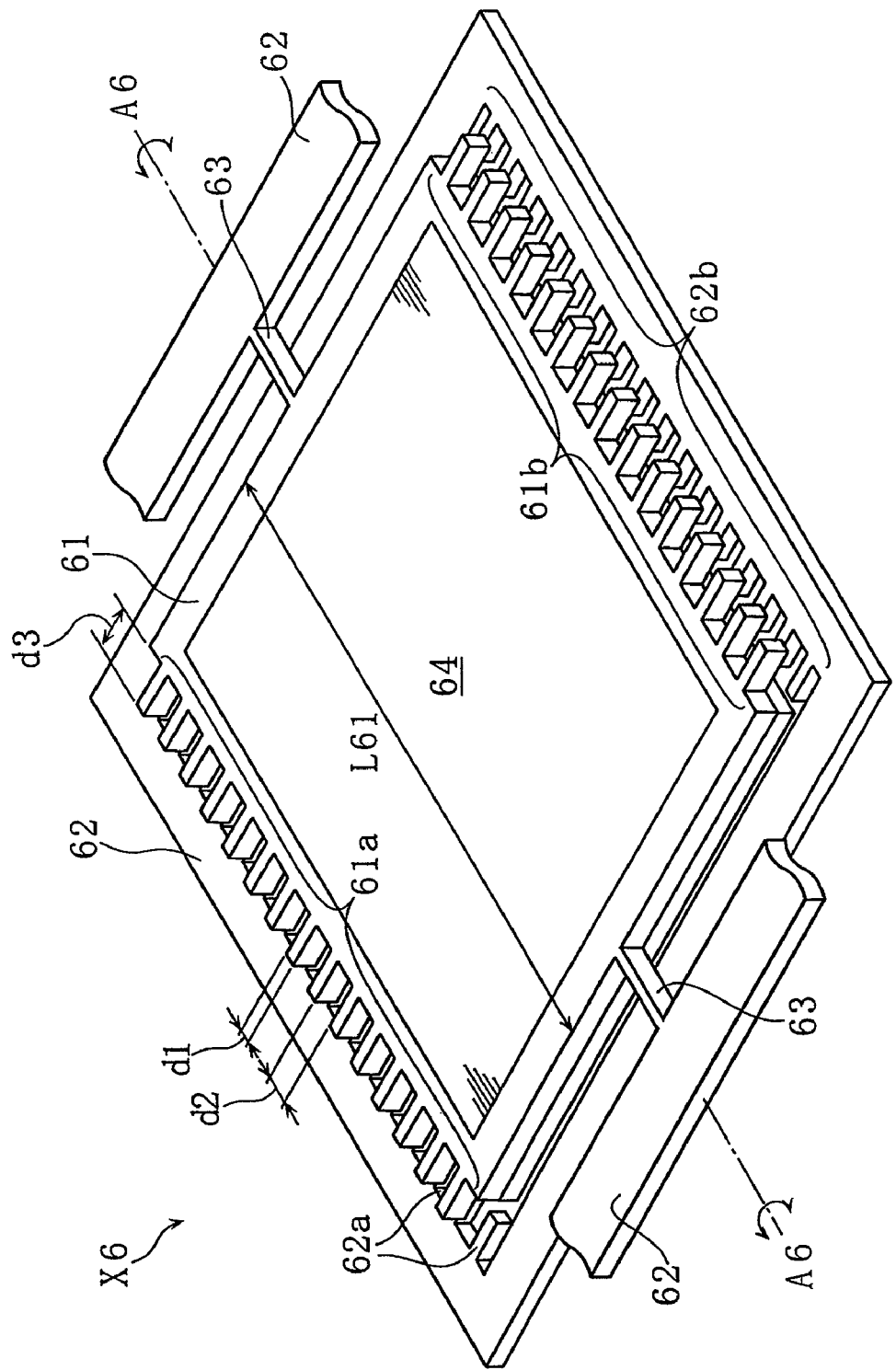
FIG. 32 is a partial perspective view of a conventional micromirror element.
Figure 33A:
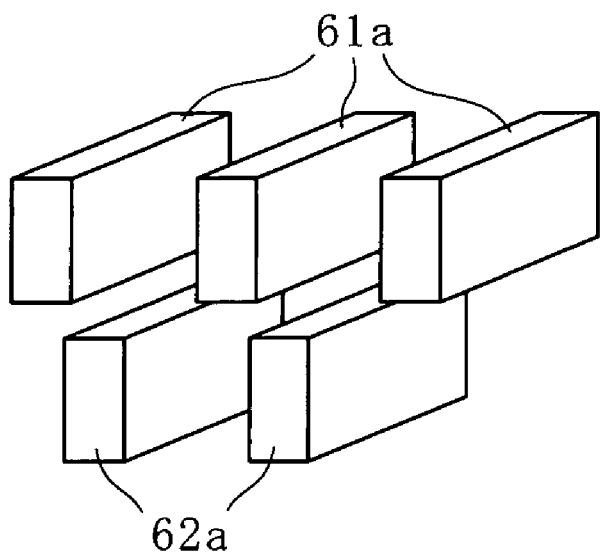
FIGS. 33A-33B show the orientation of a set of comb-tooth electrodes in the micromirror element shown in FIG. 32.
Figure 33B:
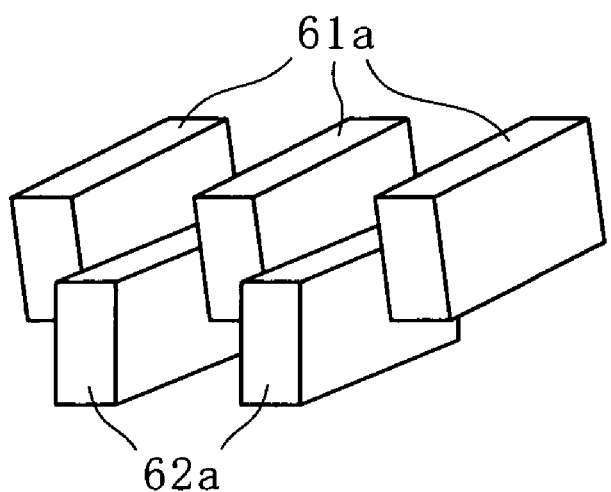

FIG. 31 shows a micromirror array Y comprising a plurality of the micromirror elements X5. To facilitate understanding of the drawing, in FIG. 31 the oscillation section 10, frames 21, 51, arm section 52, and comb-tooth electrode 55 are diagonally shaded. In the micromirror array Y, the plurality of micromirror elements X5 are arranged in series in the direction of the rotary axis A1. Hence in the micromirror array Y, the plurality of mirror surfaces 11a are arranged in series in the direction of the rotary axis A1. As described above, each micromirror element X5 is suitable for achieving miniaturization by reducing the dimension of the entire element in the rotary axis A1 direction, while obtaining a sufficient driving force. Therefore, according to the micromirror array Y, the plurality of mirror surfaces 11a can be arranged at a narrow pitch. In other words, with the micromirror array Y, the plurality of mirror surfaces 11a may be disposed at a high density in the oscillation axis A1 direction. In addition, in each micromirror element X5, the mirror supporting portion 11 and torsion bars 22a (torsional joining section 22) overlap in the rotary axis A1 direction. Such a constitution is favorable for achieving a high density of the mirror surfaces 11a in the oscillation axis A1 direction.

The invention claimed is:

1. A micro oscillating element comprising:
an oscillation section supporting frame;
an oscillation section including a movable functional section, an arm section and a first comb-tooth electrode, the arm section extending from the movable functional section, the first comb-tooth electrode including a plurality of first electrode teeth each extending from the arm section in a direction intersecting the arm section;
a torsional joining section which connects the frame and the oscillation section to each other and also defines a first oscillation axis of an oscillating operation of the oscillation section;
a second comb-tooth electrode cooperating with the first comb-tooth electrode for causing the oscillation section to oscillate, the second comb-tooth electrode comprising a plurality of second electrode teeth each extending from the frame in a direction intersecting the arm section;
an additional frame connected to the oscillation section supporting frame via an additional torsional joining section, the additional torsional joining section defining a second oscillation axis of an oscillating operation of the oscillation section supporting frame, the second oscillation axis extending in a direction intersecting the first oscillation axis; and
a driving mechanism for causing the oscillation section supporting frame to oscillate about the second oscillation axis;
wherein the first comb-tooth electrode and the second comb-tooth electrode are spaced apart from each other in an oscillating direction of the oscillation section;
an additional arm section extending from the additional frame, a third comb-tooth electrode and a fourth comb-tooth electrode,
wherein the third comb-tooth electrode comprises a plurality of third electrode teeth that extend from the additional arm section in a direction intersecting the additional arm section, and that are spaced from each other in a longitudinal direction of the additional arm section, and
wherein the fourth comb-tooth electrode comprises a plurality of fourth electrode teeth arranged to extend in a direction intersecting the additional arm section and to be spaced from each other in a longitudinal direction of the additional arm section, the third comb-tooth electrode causing the oscillation section supporting frame to oscillate in cooperation with the fourth comb-tooth electrode, the first comb-tooth electrode and the third comb-tooth electrode being electrically separated from each other;
the micro oscillating element further comprising another arm section extending from the oscillation section supporting frame, wherein the fourth electrode teeth extend from said another arm section, and wherein said another arm section and the arm section of the oscillation section are aligned with each other along the second oscillation axis.

2. The micro oscillating element according to claim 1, wherein each of the plurality of first electrode teeth extends in parallel to the first oscillation axis.

3. The micro oscillating element according to claim 1, wherein each of the second electrode teeth extends in parallel to the first electrode teeth.

4. The micro oscillating element according to claim 1 further comprising a third comb-tooth electrode and a fourth comb-tooth electrode cooperating with the third comb-tooth electrode for causing the oscillation section to oscillate, wherein the third comb-tooth electrode comprises a plurality of third electrode teeth that extend from the arm section in a direction intersecting the arm section, and that are spaced from each other in a longitudinal direction of the arm section, and wherein the fourth comb-tooth electrode comprises a plurality of fourth electrode teeth that extend from the frame in a direction intersecting the arm section, and that are spaced from each other in a longitudinal direction of the arm section.

5. The micro oscillating element according to claim 4, wherein the first comb-tooth electrode and the third comb-tooth electrodes are electrically connected to each other.

6. The micro oscillating element according to claim 1, wherein the second comb-tooth electrode and the fourth comb-tooth electrodes are electrically separated from each other.

* * * * *